United States Patent
Kamio

(10) Patent No.: US 12,384,256 B2
(45) Date of Patent: Aug. 12, 2025

(54) CONTROL APPARATUS FOR VEHICLE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 215 days.

(21) Appl. No.: 17/958,842

(22) Filed: Oct. 3, 2022

(65) Prior Publication Data

US 2023/0022163 A1    Jan. 26, 2023

Related U.S. Application Data

(63) Continuation of application No. PCT/JP2021/008122, filed on Mar. 3, 2021.

(30) Foreign Application Priority Data

Apr. 2, 2020   (JP) .................. 2020-066556

(51) Int. Cl.
*B60L 15/20* (2006.01)
*B60L 7/10* (2006.01)

(52) U.S. Cl.
CPC ............ *B60L 15/2018* (2013.01); *B60L 7/10* (2013.01); *B60L 2240/12* (2013.01); *B60L 2240/14* (2013.01); *B60L 2240/32* (2013.01); *B60L 2240/421* (2013.01); *B60L 2240/423* (2013.01)

(58) Field of Classification Search
CPC .... B06L 15/2018; B60L 7/10; B60L 2240/12; B60L 2240/14; B60L 2240/32; B60L 2240/421; B60L 2240/423; B60L 15/2018
USPC .......... 701/22, 70–71, 73, 78, 83–84
See application file for complete search history.

(56) References Cited

U.S. PATENT DOCUMENTS

| | | | | | |
|---|---|---|---|---|---|
| 5,467,275 | A | * | 11/1995 | Takamoto | B60L 7/06 318/587 |
| 6,246,944 | B1 | * | 6/2001 | Maruyama | B60L 15/2018 303/167 |
| 6,456,909 | B1 | * | 9/2002 | Shimada | B60L 7/26 701/84 |
| 8,849,538 | B2 | * | 9/2014 | Kato | B60L 9/18 701/84 |

(Continued)

FOREIGN PATENT DOCUMENTS

| JP | 2000-270405 A | 9/2000 |
|---|---|---|
| JP | 2012-91719 A | 5/2012 |

(Continued)

OTHER PUBLICATIONS

Liang Zhang et al., Control strategy of regenerative braking system in electric vehicles, 2018, Elsevier Ltd., pp. 1-6 (pdf).*

(Continued)

*Primary Examiner* — Manglesh M Patel
(74) *Attorney, Agent, or Firm* — Oliff PLC

(57) ABSTRACT

A control apparatus for a vehicle includes an offset torque calculator configured to perform calculation of offset torque to be applied to at least one wheel of the vehicle. The offset torque is required to stop the vehicle on a sloping road having a predetermined gradient. The control apparatus includes a motor controller configured to, for stopping the vehicle on the sloping road having the predetermined gradient, perform control of causing output torque of the motor-generator to asymptotically approach the offset torque.

12 Claims, 12 Drawing Sheets

(56) References Cited

U.S. PATENT DOCUMENTS

| | | | |
|---|---|---|---|
| 9,434,362 B2* | 9/2016 | Harding | B60L 7/26 |
| 10,300,795 B2* | 5/2019 | Sawada | B60L 7/18 |
| 11,130,403 B1* | 9/2021 | Woodland | B60T 1/10 |
| 2009/0043465 A1* | 2/2009 | Tomita | B60K 6/445 |
| | | | 701/51 |
| 2009/0107740 A1* | 4/2009 | Bell | B60L 15/2081 |
| | | | 701/22 |
| 2010/0280745 A1* | 11/2010 | Gorai | B62K 11/007 |
| | | | 180/54.1 |
| 2011/0029172 A1* | 2/2011 | Kwon | B60L 15/2009 |
| | | | 318/452 |
| 2012/0158266 A1* | 6/2012 | Miyazaki | B60W 20/13 |
| | | | 701/70 |
| 2013/0060433 A1* | 3/2013 | Maruyama | B60T 7/122 |
| | | | 701/53 |
| 2013/0085631 A1* | 4/2013 | Kim | B60L 58/13 |
| | | | 701/22 |
| 2013/0116874 A1* | 5/2013 | Ichinose | B60L 15/20 |
| | | | 701/22 |
| 2013/0184906 A1* | 7/2013 | Harper | B60L 15/2009 |
| | | | 701/22 |
| 2013/0210575 A1* | 8/2013 | Kumazaki | F16H 63/502 |
| | | | 477/20 |
| 2014/0379190 A1 | 12/2014 | Sawada | |
| 2016/0297321 A1* | 10/2016 | Komatsu | B60L 15/2018 |
| 2016/0347202 A1 | 12/2016 | Sawada et al. | |
| 2017/0282925 A1* | 10/2017 | Geller | B60T 8/3255 |
| 2017/0297558 A1* | 10/2017 | Afram | B60K 6/387 |
| 2018/0043792 A1* | 2/2018 | Sawada | B60W 30/18127 |
| 2018/0065629 A1* | 3/2018 | Wolff | B60W 30/18009 |
| 2018/0326852 A1* | 11/2018 | Shiozawa | B60W 40/076 |
| 2018/0334038 A1* | 11/2018 | Zhao | B60W 30/16 |
| 2018/0354474 A1* | 12/2018 | Zhang | B60T 7/12 |
| 2018/0354495 A1* | 12/2018 | Kumazaki | B60W 10/115 |
| 2019/0039450 A1* | 2/2019 | Baba | F16H 63/502 |
| 2019/0315323 A1* | 10/2019 | Matsuki | B60T 8/17552 |
| 2021/0086622 A1* | 3/2021 | Zhang | B60L 7/26 |
| 2021/0370913 A1* | 12/2021 | Yang | B60W 10/11 |
| 2023/0174043 A1* | 6/2023 | Goossens | B60W 10/08 |
| | | | 701/50 |

FOREIGN PATENT DOCUMENTS

| | | |
|---|---|---|
| JP | 2016-111759 A | 6/2016 |
| JP | 2020-022268 A | 2/2020 |

OTHER PUBLICATIONS

Zeyu Chen et al., Regenerative Braking Control Strategy for Distributed Drive Electric Vehicles Based on Slope and Mass Co-Estimation, Dec. 2023, vol. 24, No. 12, IEEE, pp. 1-10 (pdf).*

M. Akif Kunt, Advisor Based Modelling of Regenerative Braking Performance of Electric Vehicles at Different Road Slopes, 2020, International Journal Of Automotive Science And Technology, vol. 4, No. 2, pp. 98-104.*

Jindong Bian et al., Effect of road gradient on regenerative braking energy in a pure electric vehicle, 2017, Journal Of Automobile Engineering, vol. 232(13), pp. 1-11 (pdf).*

* cited by examiner

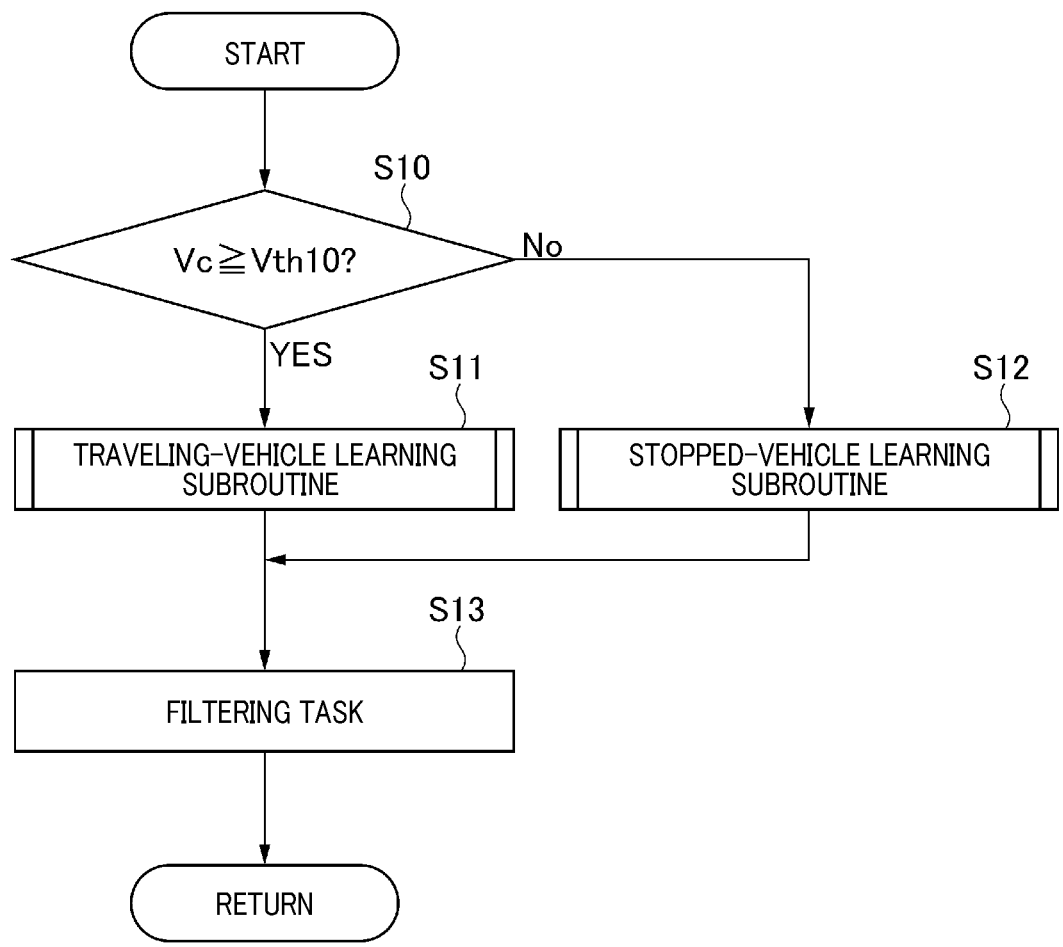

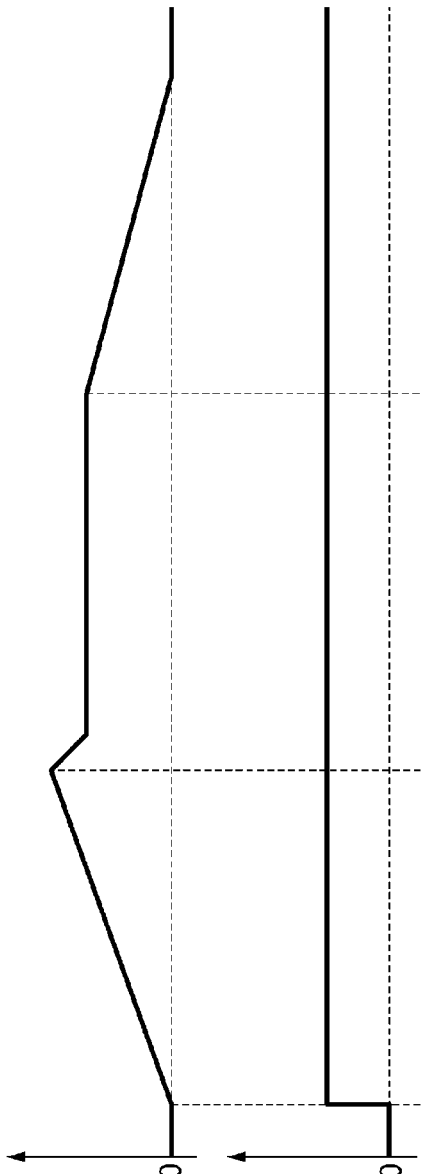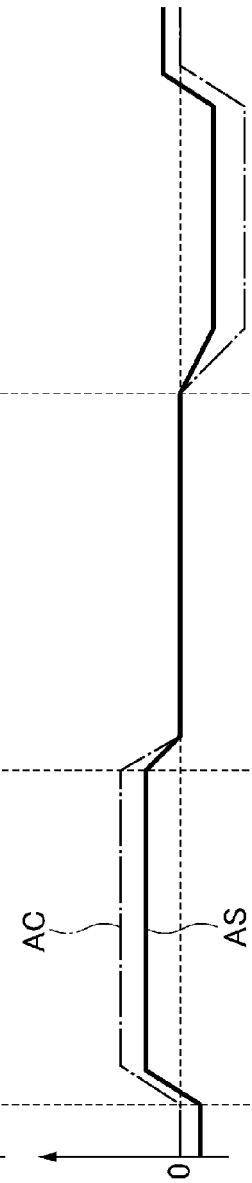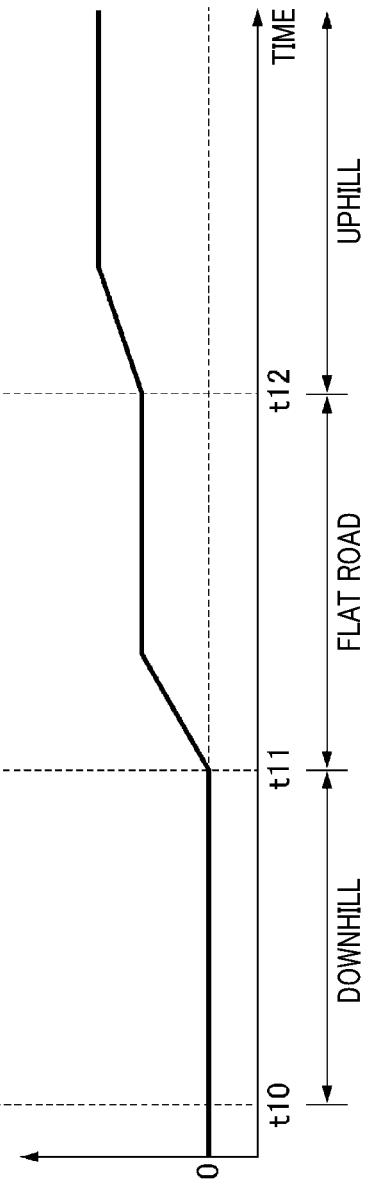

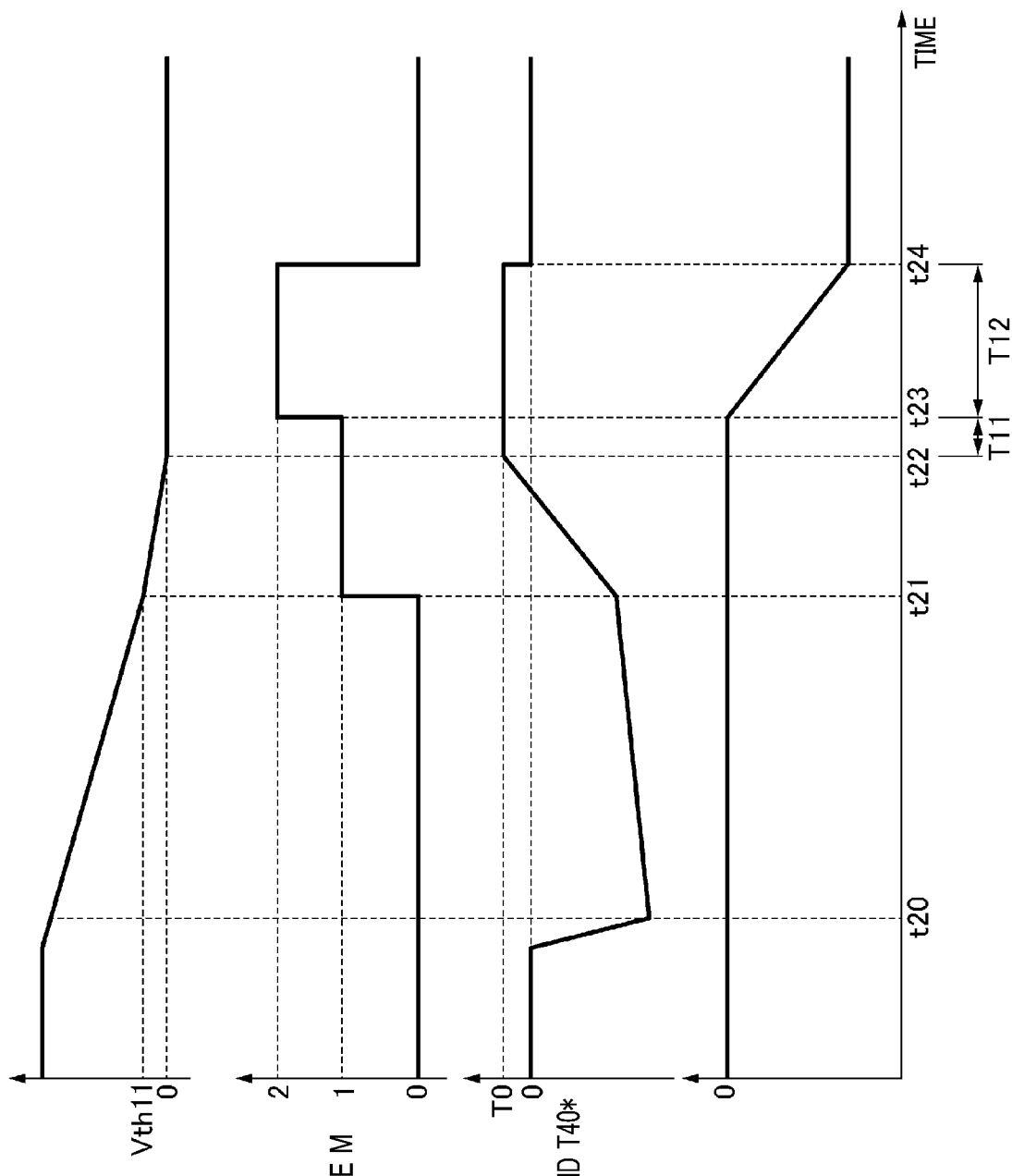

CONTROL APPARATUS FOR VEHICLE

CROSS REFERENCE TO RELATED APPLICATION

The present application is a bypass continuation application of currently pending international application No. PCT/JP2021/008122 filed on Mar. 3, 2021 designating the United States of America, the entire disclosure of which is incorporated herein by reference, the internal application being based on and claiming the benefit of priority from Japanese Patent Application No. 2020-066556 filed on Apr. 2, 2020.

TECHNICAL FIELD

The present disclosure relates to control apparatuses for a vehicle.

BACKGROUND

One of such typical control apparatuses for a vehicle is configured to drive a motor-generator installed in the vehicle to thereby control how the vehicle travels.

SUMMARY

An exemplary aspect of the present disclosure provides a control apparatus that includes a motor controller for a vehicle. The motor controller is configured to, for stopping the vehicle on a sloping road having a predetermined gradient, perform control of causing output torque of a motor-generator to asymptotically approach offset torque, i.e., compensation torque, that is required to stop the vehicle on the sloping road.

BRIEF DESCRIPTION OF THE DRAWINGS

Other aspects of the present disclosure will become apparent from the following description of embodiments with reference to the accompanying drawings in which:

FIG. 6 is a flowchart schematically illustrating a part of a learning routine of offset torque carried out by a stop controller according to the first embodiment;

FIGS. 9A to 9D are a joint timing chart schematically illustrating how (i) the speed of the vehicle, (ii) total output torque of motor-generators, (iii) first acceleration of the vehicle in a traveling direction of the vehicle, (iv) second acceleration of the vehicle, and (v) the offset torque change over time;

FIGS. 10A to 10D are a joint timing chart schematically illustrating how (i) the speed of the vehicle, (ii) a stop-control mode, (iii) a final torque command, and (iv) braking force change over time;

DETAILED DESCRIPTION OF EMBODIMENTS

Figure 1:
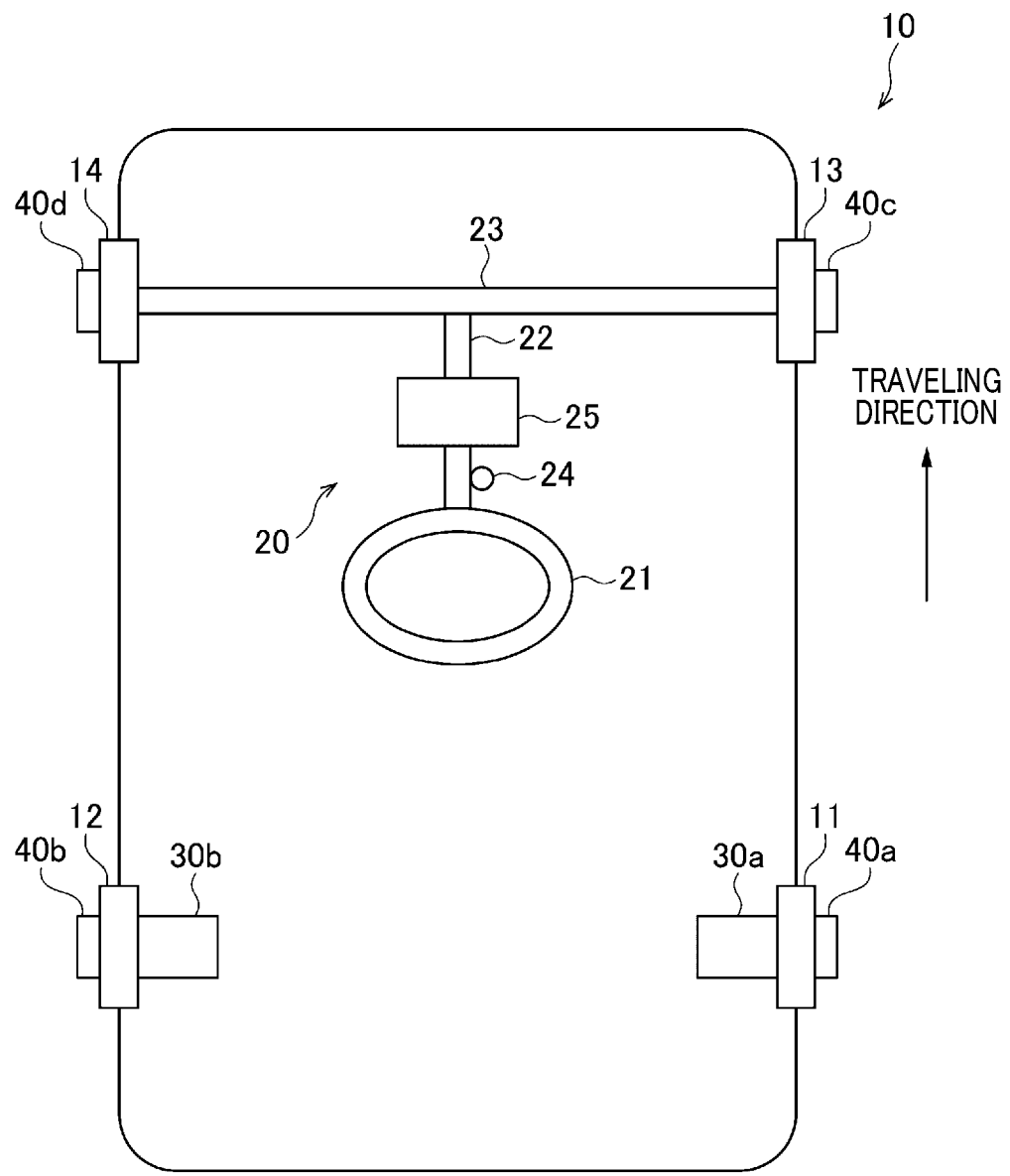
FIG. 1 is a diagram illustrating a schematic configuration of a vehicle according to the first embodiment of the present disclosure.

An example of control apparatuses for controlling a motor-generator installed in a vehicle is disclosed in Japanese Patent Application Publication No. 2020-22268. The vehicle disclosed in the above patent publication is an electric vehicle. The electric vehicle includes first and second motor-generators. Each of the first and second motor-generators generates power and transfers the generated power to a corresponding pair of wheels of the vehicle, thus causing the electric vehicle to travel. In the electric vehicle, braking devices are provided for the respective wheels. Each braking device is configured to brake the corresponding wheel in accordance with hydraulic pressure.

The control apparatus disclosed in the patent publication controls operations of each of the first and second motor-generators to thereby control how the electric vehicle travels. The control apparatus disclosed in the patent publication activates each braking device to thereby cause the corresponding braking device to apply braking force to the corresponding wheel, thus controlling how to brake the electric vehicle.

Typical vehicles each have an adaptive cruise control (ACC) function of automatically controlling the speed of the corresponding vehicle to cause the corresponding vehicle to follow a preceding vehicle in front of the corresponding vehicle. These typical vehicles having the ACC function are required to smoothly stop as early as possible in response to stop of the preceding vehicle.

Such an electric vehicle disclosed in the patent publication is configured such that each of the first and second motor-generators serves as a generator to recover energy in a regenerative mode to apply braking force, i.e., braking torque, to the corresponding pair of wheels. Braking of a vehicle's wheel using the energy recovering operation of a motor-generator can control the braking force, i.e., the braking torque, to be applied to the vehicle's wheel more closely than braking of a vehicle's wheel using hydraulic pressure by a braking device. Braking of a vehicle's wheel based on the energy recovering operation of a motor-generator also has a more advantage for reduction in electricity consumption than braking of a vehicle's wheel based on hydraulic pressure by a braking device.

From this viewpoint, it is preferable to brake an electric vehicle, which is traveling based on the ACC function, using the motor-generator's braking force.

It may be unfortunately difficult to brake, using the motor-generator's braking force, a vehicle that is traveling on a slope due to, as disturbance factors, the gradient of the slope and/or the weight of the vehicle. Specifically, excessively small amount of motor-generator's braking force may make it difficult to stop the vehicle on a slope, and an excessively large amount of motor-generator's braking force may stop the vehicle on a slope, but may impose a shock on one or more occupants of the vehicle at the stop of the vehicle, resulting in the one or more occupants having a feeling of discomfort.

The above issue may be a common issue for not only vehicles with the ACC function but also various vehicles capable of stopping using motor-generator's braking force.

From this viewpoint, the present disclosure seeks to provide control apparatuses for a vehicle, each of which is capable of stopping the vehicle on a slope more smoothly.

An exemplary measure of the present disclosure is to provide a control apparatus for causing a motor-generator of a vehicle to apply drive power to at least one wheel of the vehicle, and operate, at a stop of the vehicle, in a regenerative mode to apply braking force to the at least one wheel of the vehicle. The control apparatus includes an offset torque calculator configured to perform calculation of offset torque to be applied to the at least one wheel of the vehicle. The offset torque is required to stop the vehicle on a sloping road having a predetermined gradient. The control apparatus includes a motor controller configured to, for stopping the vehicle on the sloping road having the predetermined gradient, perform control of causing output torque of the motor-generator to asymptotically approach the offset torque.

The above configuration of the control apparatus according to the exemplary measure of the present disclosure causes the output torque of the motor-generator to gradually change toward the offset torque, making it possible to prevent the occurrence of shock at the stop of the vehicle.

The above configuration of the control apparatus additionally causes the motor-generator to apply the offset torque to the at least one wheel at the stop of the vehicle on the sloping road having the predetermined gradient, making it possible to hold the vehicle in a stopped state on the sloping road having the predetermined gradient.

This therefore enables the vehicle to stop on such a sloping road more smoothly.

The following describes exemplary embodiments of the present disclosure with reference to the accompanying drawings. In the drawings, elements, which are structurally and/or functionally identical to one another, are each assigned with a common reference character, and duplicated descriptions of the structurally and/or functionally identical elements among the exemplary embodiments are omitted for the sake of facilitating the understanding of the exemplary embodiments.

First Embodiment

A vehicle 10 according to the first embodiment includes a right rear wheel 11, a left rear wheel 12, a right front wheel 13, a left front wheel 14, a steering apparatus 20, in-wheel motors 30a and 30b, and braking devices 40a to 40d.

The steering apparatus 20, which is comprised of a steering wheel 21, a steering shaft 22, and a steering mechanism 23, is configured to transfer, in response to application of steering torque to the steering wheel 21 based on driver's rotation of the steering wheel 21, the steering torque to the steering mechanism 23 through the steering shaft 22. The steering mechanism 23 is configured to change, based on the steering torque, a steering angle of each of the right front wheel 13 and the left front wheel 14.

In particular, the steering apparatus 20 includes a torque sensor 24 and an actuator 25. The torque sensor 24 measures the steering torque applied to the steering wheel 21 based on driver's rotation of the steering wheel 21. The actuator 25 is configured to create assist torque based on the steering torque measured by the torque sensor 24, and apply, to the steering shaft 22, the assist torque, thus assisting driver's rotation of the steering wheel 21.

The in-wheel motors 30a and 30b are installed in the respective right rear wheel 11 and left rear wheel 12.

Figure 2:
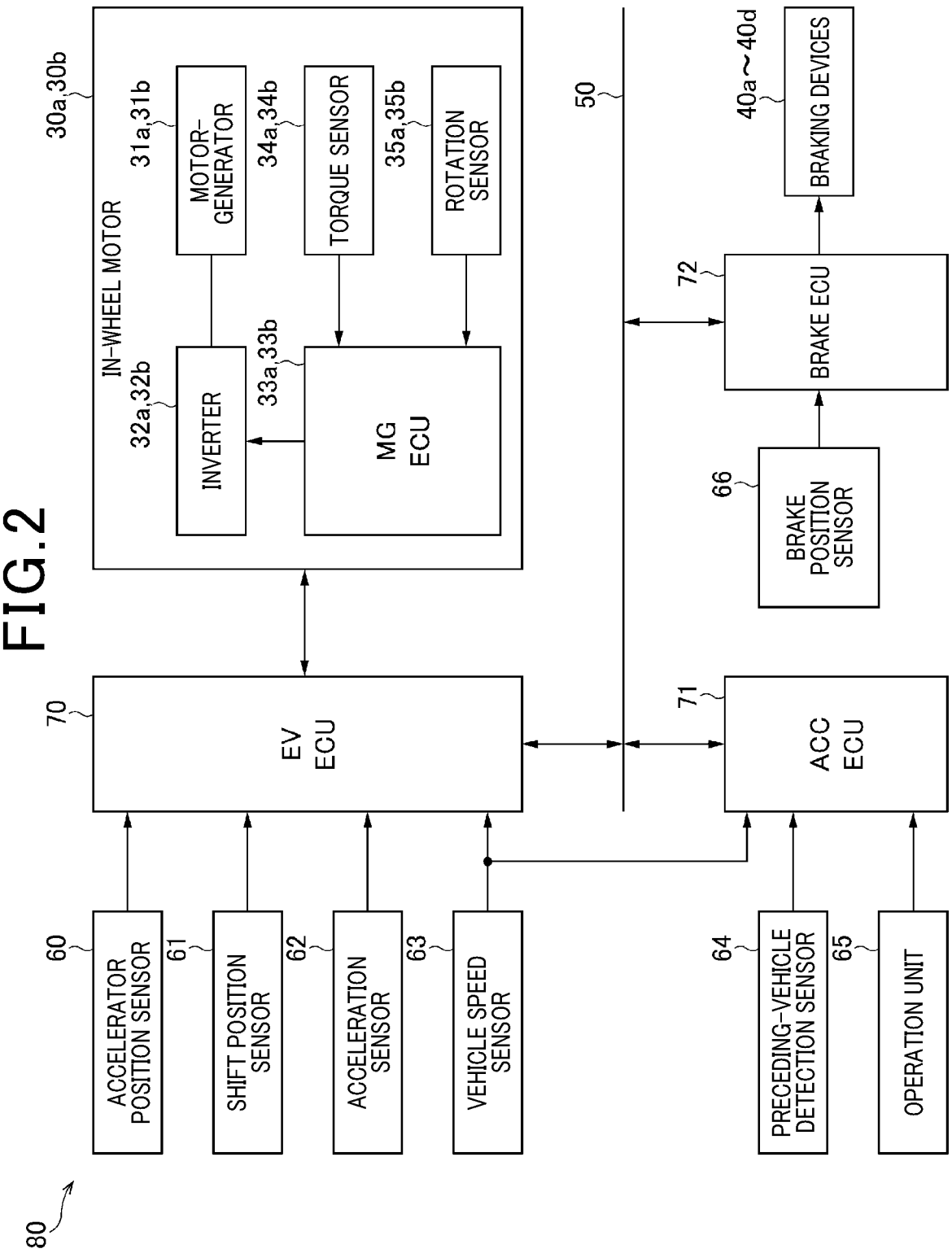
FIG. 2 is a block diagram illustrating an electrical configuration of the vehicle according to the first embodiment.

Referring to FIG. 2, the in-wheel motor 30a includes a motor-generator 31a, an inverter 32a, a motor-generator (MG) ECU 33a, a torque sensor 34a, and a rotation sensor 35a. Similarly, the in-wheel motor 30b includes a motor-generator 31b, an inverter 32b, an MG ECU 33b, a torque sensor 34b, and a rotation sensor 35b.

The torque sensors 34a and 34b serve as torque measuring units.

The inverter 32a is configured to convert direct-current (DC) power supplied from a battery installed in the vehicle 10 into three-phase alternating-current (AC) power, and supply the converted three-phase AC power to the motor-generator 31a.

The motor-generator 31a serves as a motor to cause the vehicle 10 to travel. The motor-generator 31 serves as a motor to generate drive power based on the three-phase AC power supplied from the inverter 32a. The drive power supplied to the right rear wheel 11 rotates the right rear wheel 11, thus causing the vehicle 10 to travel.

The motor-generator 31a also serves as a power generator when the vehicle 10 is braked. The motor-generator 31 serves as a power generator to operate in a regenerative mode to (i) generate regenerative three-phase AC power, and (ii) apply braking force, i.e., braking torque, to the right rear wheel 11. The regenerative three-phase AC power is converted by the inverter 32a to DC power, and the DC power is charged in the battery of the vehicle 10.

The MG ECU 33a includes a microcomputer as its essential component; the microcomputer is comprised of at least one CPU and at least one memory. The at least one CPU of the MG ECU 33a runs program instructions stored in the at least one memory to thereby controllably drive the inverter 32a, thus controlling how the motor-generator 31a is energized.

The torque sensor 34a is configured to measure output torque of the motor-generator 31a, and output, to the MG ECU 33a, a torque-based signal that correlates to the measured output torque. The rotation sensor 35a is configured to measure a rotational speed of the output shaft of the motor-generator 31a, and output, to the MG ECU 33a, a speed-based signal that correlates to the measured rotational speed.

The MG ECU 33a is configured to obtain, based on the torque-based and speed-based signals, information about the output torque and the rotational speed of the motor-generator 31a.

Because the configuration and operations of each of the motor-generator 31b, inverter 32b, MG ECU 33b, torque sensor 34b, and rotation sensor 35b are substantially identical to those of the corresponding one of the motor-generator 31a, inverter 32a, MG ECU 33a, torque sensor 34a, and rotation sensor 35a, detailed descriptions of the configuration and operations of each of the motor-generator 31b, inverter 32b, MG ECU 33b, torque sensor 34b, and rotation sensor 35b are omitted.

Referring to FIG. 1, the braking devices 40a to 40d are mounted to the respective wheels 11 to 14. Each of the braking devices 40a to 40d is configured to apply braking force to the corresponding one of the wheels 11 to 14 in accordance with hydraulic pressure supplied from a hydraulic circuit installed in the vehicle 10, thus braking the vehicle 10. As each braking device 40a to 40d, a friction braking device can be used, which applies friction force to a rotating member of the corresponding wheel 11 to 14.

The right rear wheel 11 and left rear wheel 12 respectively serve as driving wheels of the vehicle 10, and the right front wheel 13 and left front wheel 14 respectively serve as driven wheels of the vehicle 10.

Next, the following describes an electrical configuration of the vehicle 10 with reference to FIG. 2.

Referring to FIG. 2, the vehicle 10 includes an accelerator position sensor 60, a shift position sensor 61, an acceleration sensor 62, a vehicle speed sensor 63, a preceding-vehicle detection sensor 64, an operation unit 65, and a brake position sensor 66. The vehicle 10 includes an electric-vehicle (EV) ECU 70, an adaptive cruise control (ACC) ECU 71, and a brake ECU 72; these ECUs serve to perform various control tasks of the vehicle 10. The acceleration sensor 62 of the first embodiment serves as a second acceleration determiner, and various components illustrated in FIG. 2 constitute a control apparatus 80.

The accelerator position sensor 60 is configured to measure a current position of an accelerator pedal of the vehicle 10 operable by a driver and output, to the EV ECU 70, a measurement signal indicative of the measured position of the accelerator pedal.

The shift position sensor 61 is configured to measure a current position of a shift lever of the vehicle 10 operable by a driver and output, to the EV ECU 70, a measurement signal indicative of the measured position of the shift lever. The changeable position of the shift lever selects one of drive ranges of the vehicle 10, which include, for example, Drive range and Reverse range, and other drive ranges.

The acceleration sensor 62 is configured to measure an acceleration of the vehicle 10 in a traveling direction thereof, and output, to the EV ECU 70, a measurement signal indicative of the measured acceleration of the vehicle 10. The acceleration sensor 62 measures a positive value of the acceleration of the vehicle 10 when the vehicle 10 is accelerating in the forward direction, and measures a negative value of the acceleration of the vehicle 10 when the vehicle 10 is decelerating in the forward direction.

The vehicle speed sensor 63 is configured to measure a speed of the vehicle 10 in the traveling direction, and output, to the EV ECU 70 and ACC ECU 71, a measurement signal indicative of the measured speed of the vehicle 10.

The preceding-vehicle detection sensor 64 is configured to detect a preceding vehicle traveling in front of the vehicle 10, and output, to the ACC ECU 71, information indicative of the detected preceding vehicle. An image capturing device and/or a millimeter-wave radar device can be used as the preceding-vehicle detection sensor 63. The image capturing device captures images of a forwarding region of the vehicle 10, and analyzes the captured images to thereby detect a preceding vehicle traveling in front of the vehicle 10. The millimeter-wave radar device is configured to emit millimeter radio waves, and analyze echoes resulting from the emitted millimeter radio waves to thereby detect a preceding vehicle traveling in front of the vehicle 10.

The operation unit 65 is a device which a driver operates to input various information items to the ACC ECU 71. The information items include an information item indicative of enabling/disabling an ACC function that automatically controls the speed of the vehicle 10 to cause the vehicle 10 to follow the preceding vehicle. The information items include an information item indicative of a constant speed of the vehicle 10 when the ACC function is enabled. The operation unit 65 is configured to output, to the ACC ECU 71, information items inputted by driver's operation of the operation unit 65.

The brake position sensor 66 is configured to measure a current position of a brake pedal of the vehicle 10 operable by a driver and output, to the brake ECU 72, a measurement signal indicative of the measured position of the brake pedal.

Each of the ECUs 70 to 72 includes a microcomputer as its essential component; the microcomputer is comprised of at least one CPU and at least one memory. Each of the ECUs 70 to 72 is configured to transmit, through an in-vehicle network, such as a CAN network, various information items to external devices, and receive, from external devices, various information items through the in-vehicle network.

The ACC ECU 71, i.e., its CPU, runs program instructions stored in its memory to thereby perform an ACC task. Specifically, the ACC ECU 71 is programmed to perform the ACC task in response to receiving of the information item indicative of enabling the ACC function from the operation unit 65.

For example, when the ACC function is enabled, the ACC ECU 71 sets an ACC flag Fa to on, and transmits the ACC flag Fa to the EV ECU 70. Otherwise, when the ACC function is disabled, the ACC ECU 71 sets the ACC flag Fa to off, and transmits the ACC flag Fa to the EV ECU 70. This enables the EV ECU 70 to determine whether the ACC function is enabled or disabled in accordance with the on state or off state of the ACC flag Fa.

The ACC ECU 71 transmits, to the EV ECU 70, a first ACC torque command T21* together with the ACC flag Fa upon determination that no preceding vehicles are detected by the preceding-vehicle detection sensor 64 while the ACC function is enabled. The first ACC torque command T21* represents a target value for first total torque that should be outputted by each of the motor-generator 31a and 31b of the in-wheel motors 30a and 30b in order to cause the vehicle 10 to travel at the constant speed set through the operation unit 65.

The EV ECU 70 is configured to control, based on the first ACC torque command T21*, each of the motor-generators 31a and 31b of the in-wheel motors 30a and 30b to thereby cause the vehicle 10 to travel at the constant speed set through the operation unit 65.

When a preceding vehicle traveling in front of the vehicle 10 is detected by the preceding-vehicle detection sensor 71 while the ACC function is enabled, the ACC ECU 71 calculates, based on the information indicative of the preceding vehicle outputted from the preceding-vehicle detection sensor 64, a relative speed and a relative distance of the preceding vehicle relative to the vehicle 10. Then, the ACC ECU 71 calculates, based on the relative speed and relative distance of the preceding vehicle relative to the vehicle 10, a second ACC torque command T22*, and transmits, to the EV ECU 70, the second ACC torque command T22* together with the ACC flag Fa.

The second ACC torque command T22* represents a target value for second total torque that should be outputted by each of the motor-generator 31a and 31b of the in-wheel motors 30a and 30b in order to maintain the relative distance of the preceding vehicle relative to the vehicle 10 at a predetermined distance. The second ACC torque command T22* is set to a positive value in case of acceleration of the vehicle 10, or a negative value in case of deceleration of the vehicle 10.

The EV ECU 70 is configured to control, based on the second ACC torque command T22*, each of the motor-generators 31a and 31b of the in-wheel motors 30a and 30b to thereby cause the vehicle 10 to follow the preceding vehicle while maintaining a predetermined following distance between the preceding vehicle and the vehicle 10.

As described above, the ACC ECU 71 is configured to transmit, to the EV ECU 70, the first ACC torque command T21* or the second ACC torque command T22* together with the ACC flag Fa set to the on state when the ACC function is enabled.

In contrast, the ACC ECU 71 is configured to transmit, to the EV ECU 70, the ACC flag Fa set to the off state when the ACC function is disabled.

Figure 3:
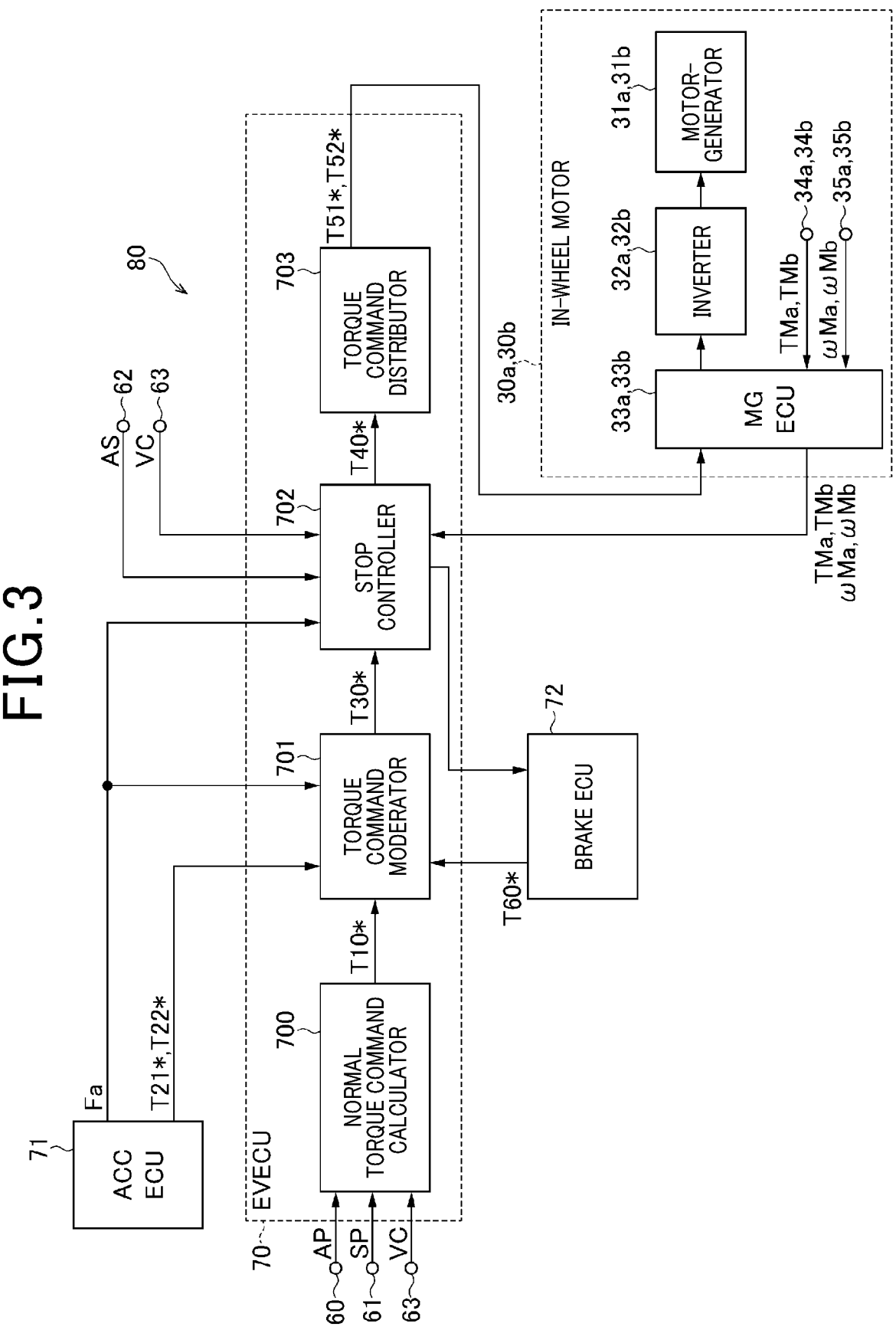
FIG. 3 is a block diagram illustrating a configuration of an EV ECU according to the first embodiment.
Figure 4:
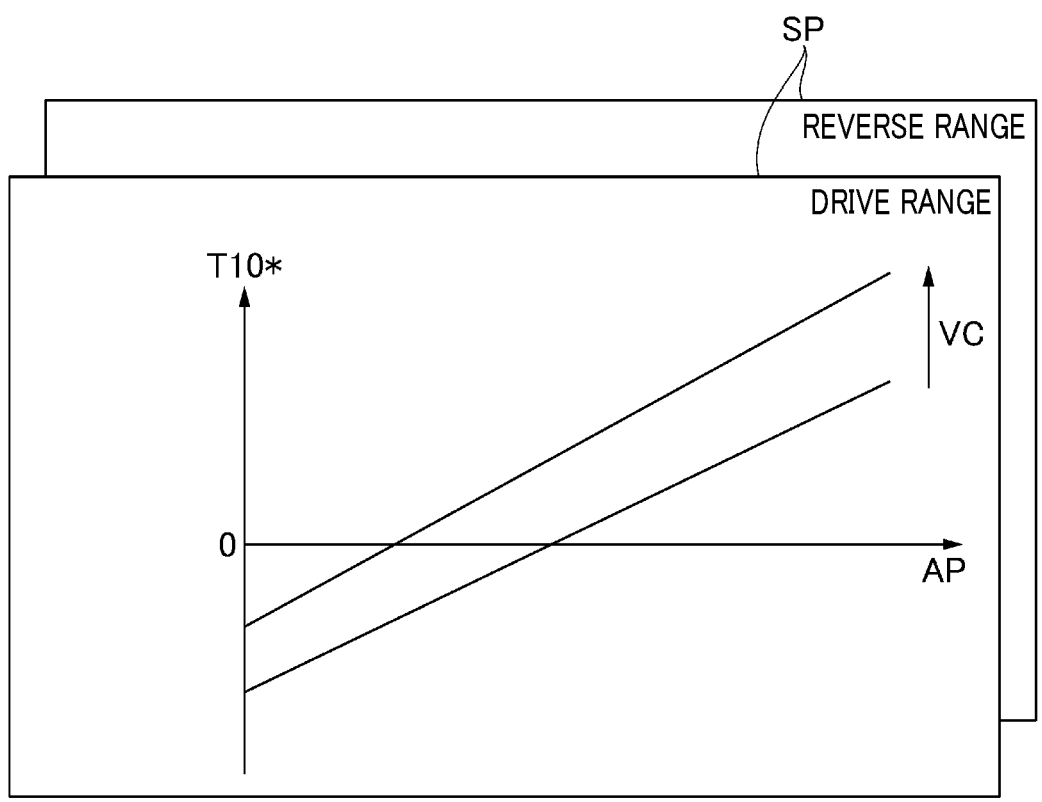
FIG. 4 is a diagram illustrating maps that are used for the EV ECU to calculate a value of a normal torque command T10* as a function of a current position of an accelerator pedal, a current shift position, a current value of a speed of a vehicle.

The EV ECU 70, i.e., its CPU, runs program instructions stored in its memory to thereby perform overall control of the traveling condition of the vehicle 10. Specifically, the EV ECU 70 includes, as illustrated in FIG. 3, a normal torque command calculator 700, a torque command moderator 701, a stop controller 702, and a torque command distributor 703.

The normal torque command calculator 700 is configured to receive the measurement signals outputted from the respective accelerator position sensor 60, shift position sensor 61, and vehicle speed sensor 62.

The normal torque command calculator 700 is configured to obtain, based on the received measurement signals, the current position, which will be referred to as AP, of the accelerator pedal, the current position, which will be referred to as shift position SP, of the shift lever, and the speed of the vehicle 10, which will be referred to as a speed VC of the vehicle 10.

Then, the normal torque command calculator 700 is configured to calculate a normal torque command T10* based on maps related to the measured current position AP of the accelerator pedal, the measured shift position SP of the shift lever, and the measured speed VC of the vehicle 10. The normal torque command T10* represents a target value of normal total torque that should be outputted by each of the motor-generator 31a and 31b of the in-wheel motors 30a and 30b. If the normal torque command T10* is set to a positive value, the target value of the normal total torque that should be outputted by each of the motor-generator 31a and 31b represents a target value of torque in an acceleration direction of the vehicle 10. Otherwise, if the normal torque command T10* is set to a negative value, the target value of the normal total torque that should be outputted by each of the motor-generator 31a and 31b represents a target value of torque in a deceleration direction of the vehicle 10.

The normal torque command calculator 700 is configured to output, to the torque command moderator 701, the calculated normal torque command T10*.

The torque command moderator 701 is configured to receive (i) the normal torque command T10* outputted from the normal torque command calculator 700, (ii) the ACC flag Fa transmitted from the ACC ECU 71, and (iii) the first ACC torque command T21* or the second ACC torque command T22* transmitted from the ACC ECU 71.

The torque command moderator 701 is configured to transmit, to the stop controller 702, the normal torque command T10* as a base torque command T30* if the ACC flag Fa is set to the off state, that is, the ACC function is disabled.

Otherwise, the torque command moderator 701 is configured to transmit, to the stop controller 702, the first ACC torque command T21* or the second ACC torque command T22* transmitted from the ACC ECU 71 as the base torque command T30* if the ACC flag Fa is set to the on state, that is, the ACC function is enabled.

The stop controller 702 is configured to receive (i) the base torque command T30* transmitted from the torque command moderator 702, (ii) the ACC flag Fa transmitted from the ACC ECU 71, and (iii) the measurement signals outputted from the respective acceleration sensor 62 and the vehicle speed sensor 63.

The stop controller 702 is configured to obtain, based on the received measurement signals, acceleration measured by the acceleration sensor 62, which will be referred to as measured acceleration, i.e., second acceleration, AS of the vehicle 10, and the speed VC of the vehicle 10 measured by the vehicle speed sensor 63.

Additionally, the stop controller 702 is configured to receive (I) The output torque and the rotational speed of the motor-generator 31a of the in-wheel motor 30a, which are outputted from the MG ECU 33a (II) The output torque and the rotational speed of the motor-generator 31b of the in-wheel motor 30b, which are outputted from the MG ECU 33b The output torque of the motor-generator 31a will be referred to as output torque TMa, the output torque of the motor-generator 31b will be referred to as output torque TMb, the rotational speed of the motor-generator 31a will be referred to as a rotational speed ωMa, and the rotational speed of the motor-generator 31b will be referred to as a rotational speed ωMb.

The stop controller 702 is configured to transmit, upon determination that the base torque command T30* is a positive value, i.e., acceleration of the vehicle 10 is needed, the base torque command T30* to the torque command distributor 703 as a final torque command T40* independently of whether the ACC flag Fa is set to the on state or the off state.

The stop controller 702 is similarly configured to transmit, upon determination that both the base torque command T30* is a negative value, i.e., deceleration of the vehicle 10 is needed, and the ACC flag Fa is set to the off state, the base torque command T30* to the torque command distributor 703 as the final torque command T40*.

In contrast, the stop controller 702 is configured to perform a correction task of correcting, upon determination that both the base torque command T30* is a negative value and the ACC flag Fa is set to the on state, the base torque command T30* in accordance with (i) the measured acceleration AS and speed VC of the vehicle 10, (ii) the output torque TMa and rotational speed ω Ma of the motor-generator 31a, and (iii) the output torque TMb and rotational speed ωMb of the motor-generator 31b. This correction of the base torque command T30* aims to suppress shock generated at the stop of the vehicle 10. The stop controller 702 is configured to transmit, to the torque command distributor 703, the corrected base torque command T30* as the final torque command T40*.

The torque command distributor 703 is configured to receive the final torque command T40* transmitted from the stop controller 702, and calculate, based on the received final torque command T40*, a first torque command T51* and a second torque command T52*. The first torque command T51* represents a target value of torque that should be outputted from the motor-generator 31a of the in-wheel motor 30a, and the second torque command T52* represents a target value of torque that should be outputted from the motor-generator 31b of the in-wheel motor 30b.

For example, the torque command distributor 703 distributes the final torque command T40* equally into the first torque command T51* and the second torque command T52* upon determination that the steering angle of the steering wheel 21 is an angle of 0 degrees, i.e., the vehicle 10 is traveling in a straight line.

As another example, the torque command distributor 703 calculates, upon determination that the steering angle of the steering wheel 21 is an angle of any degrees other than 0 degrees, a torque distribution ratio of the final torque command T40* between the motor-generator 31a and the motor-generator 31b in accordance with the steering angle of the steering wheel 21. Then, the torque command distributor 703 distributes, based on the calculated torque distribution ratio, the final torque command T40* into the first torque command T51* and the second torque command T52* such that the distributed first and second torque commands T51* and T52* satisfy the calculated torque distribution ratio therebetween.

Following the determination of the first torque command T51* and the second torque command T52*, the torque command distributor 703 transmits the first torque command T51* and the second torque command T52* to the respective MG ECU 33a and 33b of the in-wheel motors 30a and 30b.

The MG ECU 33a of the in-wheel motor 30a is configured to receive the first torque command T51* transmitted from the torque command distributor 703, and calculate, based on the received first torque command T51*, energization control information indicative of how the inverter 32a energizes the motor-generator 31a. Then, the MG ECU 33a is configured to cause the inverter 32a to supply, to the motor-generator 31a, electric power that is based on the energization control information. This results in the motor-generator 31a outputting torque that is based on the first torque command T51*.

The MG ECU 33b of the in-wheel motor 30b performs the same control operations as those performed by the MG ECU 33a of the in-wheel motor 30a. This therefore results in the motor-generator 31b outputting torque that is based on the second torque command T52*.

As described above, the EV ECU 70 of the vehicle 10 according to the first embodiment serves as a first controller for determining a torque command, and each of the MG ECUs 33a and 33b serves as a second controller for controlling energization of the corresponding one of the motor-generators 31a and 31b. The EV ECU 70, the MG ECU 33a, and the MG ECU 33b serve as a motor controller for controlling the output torque of the motor-generator 31a and the output torque of the motor-generator 31b.

The brake ECU 72, i.e., its CPU, runs program instructions stored in its memory to thereby control each of the braking devices 40a to 40d. Specifically, the brake ECU 72 is programmed to activate each of the braking devices 40a to 40d in response to detecting, based on the current position of the brake pedal measured by the brake position sensor 66, driver's depression of the brake pedal, thus causing the corresponding one of the braking devices 40a to 40d to apply braking force to the corresponding one of the wheels 11 to 14.

The brake ECU 72 is also programmed to transmit, to the torque command moderator 701 of the EV ECU 70, a braking torque command T60* (see FIG. 3) in response to detecting driver's depression of the brake pedal. The braking torque command T60* represents a target value of total torque that should be outputted by each of the motor-generator 31a and 31b of the in-wheel motors 30a and 30b in order to decelerate the vehicle 10 in a predetermined braking direction of the vehicle 10.

When receiving the braking torque command T60* transmitted from the brake ECU 72, the torque command moderator 701 is configured to transmit, to the stop controller 702, the braking torque command T60* as the base torque command T30* in priority to the normal torque command T10* and the first ACC torque command T21* or the second ACC torque command T22*. The stop adjuster 703 is configured to receive the braking torque command T60* transmitted from the torque command attributor 701 as the base torque command T30*, and transmit, to the torque command distributor 703, the base torque command T30*, i.e., the braking torque command T60*.

The torque command distributor 703 is configured to receive the base torque command T30*, i.e., the braking torque command T60*, transmitted from the torque command attributor 701, and transmit the first and second torque commands T51* and T52*, which are each based on the braking torque command T60*, to the respective MG ECU 33a and 33b of the in-wheel motors 30a and 30b.

The MG ECU 33a of the in-wheel motor 30a is configured to control, based on the first torque command T51* transmitted from the torque command distributor 703, energization of the motor-generator 31a through the inverter 32a to thereby cause the motor-generator 31a to operate in a regenerative mode to apply braking force based on the braking torque command T60* to the driving wheel 11. Similarly, the MG ECU 33b of the in-wheel motor 30b is configured to control, based on the second torque command T52* transmitted from the torque command distributor 703, energization of the motor-generator 31b through the inverter 32b to thereby cause the motor-generator 31b to operate in the regenerative mode to apply braking force based on the braking torque command T60* to the driving wheel 12.

As described above, the brake ECU 72 is configured to cause (i) each of the braking devices 40a to 40d to apply braking force to the corresponding one of the wheels 11 to 14, and (ii) each of the motor-generators 31a and 31b to apply braking force to the corresponding one of the driving wheels 11 and 12, thus stopping the vehicle 10. The brake ECU 72 of the first embodiment serves as a brake controller.

Next, the following describes an exemplary principle of how the stop controller 702 corrects the base torque command T30* while the ACC function is enabled.

Figure 5A:
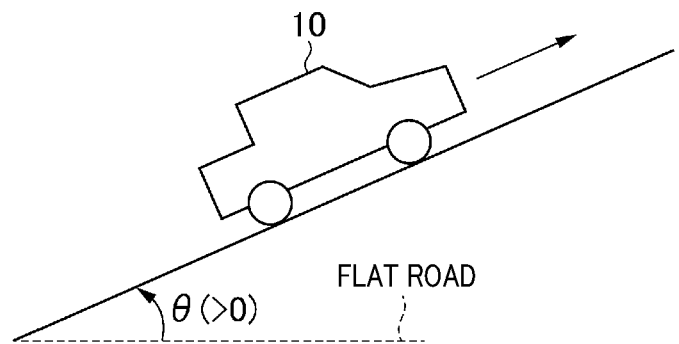
FIG. 5A is a diagram schematically illustrating a vehicle traveling on the surface of an uphill road.

As illustrated in FIG. 5A, let us consider a case of stopping the vehicle 10 on the surface of an uphill road with a gradient of 0 degrees with respect to a flat road. In this case, because force, which has the backward direction opposite to the traveling direction of the vehicle 10, is applied to the vehicle 10 due to gravity of the vehicle 10, it is difficult to hold the vehicle 10 to be stopped on the surface of the uphill road unless predetermined offset torque is applied to each wheel 11 to 14 in the traveling direction of the vehicle 10.

Similarly, let us consider a case of stopping the vehicle 10 on the surface of a downhill road with a negative gradient of 0 degrees with respect to a flat road. In this case, because force, which has the traveling direction of the vehicle 10, is applied to the vehicle 10 due to gravity of the vehicle 10, it is difficult to hold the vehicle 10 to be stopped on the surface of the uphill road unless predetermined offset torque is applied to each wheel 11 to 14 in the backward direction opposite to the traveling direction of the vehicle 10.

Figure 5B:
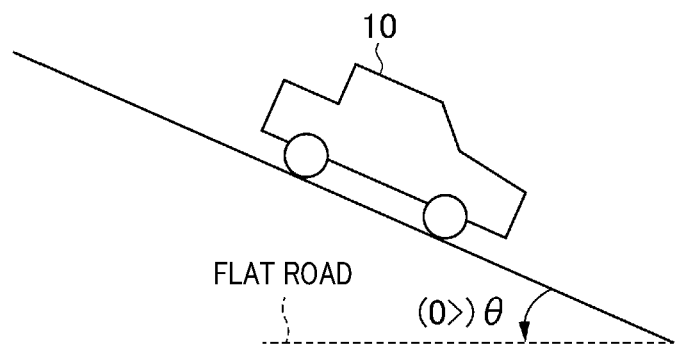
FIG. 5B is a diagram schematically illustrating a vehicle traveling on the surface of a downhill road.

Such a road surface having a gradient of 0 degrees with respect to a flat road, which is illustrated in FIG. 5A or FIG. 5B, will be referred to as a sloping road, i.e., an upslope road or a downslope road. The gradient θ of an upslope road relative to a flat road with the 0-degree gradient can be expressed as a positive angle of degrees, and the gradient θ of a downslope road relative to a flat road with the 0-degree gradient can be expressed as a negative angle of degrees.

That is, in order to stop the vehicle 10 on the surface of an upslope road (see FIG. 5A) or a downslope road (see FIG. 5B), it is necessary to apply predetermined offset torque to each wheel 11 to 14 of the vehicle 10.

From this viewpoint, the stop controller 702 of the first embodiment is configured to learn a value of the offset torque for a corresponding value of the gradient θ of a sloping road while the vehicle 10 is traveling on the surface of the sloping road with the corresponding value of the gradient θ; the learned value of the offset torque is capable of reliably stopping the vehicle 10 on the corresponding value of the gradient θ of the sloping road.

Then, when stopping the vehicle 10 on the surface of a sloping road having a value of the gradient θ, the EV ECU 70 causes each of the motor-generators 31a and 31b to operate in the regenerative mode and apply braking torque to a corresponding one of the driving wheels 11 and 12 to thereby brake the vehicle 10 while the stop controller 702 corrects the final torque command T40* such that the braking torque applied to each of the driving wheels 11 and 12 becomes gradually closer to the learned value of the offset torque corresponding to the value of the gradient θ of the sloping road.

This configuration enables the braking torque applied to each of the driving wheels 11 and 12 to have closely approached the value of the offset torque corresponding to the value of the gradient θ of the sloping road at the stop of the vehicle 10 on the surface of the sloping road. This therefore makes it possible to reliably hold or maintain the vehicle 10 in a stopped state on the surface of the sloping road.

Because the EV ECU 70 causes the braking torque applied to each of the driving wheels 11 and 12 to become gradually closer to the value of the offset torque corresponding to the value of the gradient θ of the sloping road, it is possible to suppress shock generated at the stop of the vehicle 10 on the surface of the sloping road.

As described above, in order to stop the vehicle 10 on the surface of an upslope road as illustrated in, for example, FIG. 5A, it is necessary to apply predetermined offset torque to each of the driving wheels 11 and 12 in the traveling direction, so that the offset torque to be applied to each of the driving wheels 11 and 12 has a positive value.

In contrast, in order to stop the vehicle 10 on the surface of a downslope road as illustrated in, for example, FIG. 5B, it is necessary to apply predetermined offset torque to each of the driving wheels 11 and 12 in the direction opposite to the traveling direction, so that the offset torque to be applied to each of the driving wheels 11 and 12 has a negative value.

In particular, the offset torque to be applied to the vehicle 10 on a sloping road with the gradient θ has a correlation with the gradient θ such that an absolute value of the offset torque increases with an increase in an absolute value of the gradient θ of the sloping road.

Next, the following describes an exemplary principle of how the stop controller 702 calculates the offset torque.

The following relational expression (f1) can be established assuming that the vehicle 10 is traveling on the surface of a sloping road as illustrated in FIG. 5A or 5B:

$$TM - W \cdot g \cdot \sin\theta - TL = I \cdot AC \quad \text{(f1)}$$

where:

TM represents the total output torque of the motor-generators 31a and 31b;
W represents the weight of the vehicle 10;
g represents acceleration of gravity;
TL represents a rolling resistance of a flat road;
I represents the inertia of the vehicle 10; and
AC represents acceleration of the vehicle 10 in the traveling direction.

The weight W of the vehicle 10 includes not only the weight of the vehicle 10 itself but also the total weight of at least one occupant in the vehicle 10. The acceleration AC of the vehicle 10 represents acceleration, i.e., first acceleration, of the vehicle 10 in the traveling direction.

Because the vehicle 10 is estimated to travel at a low speed just before a stop, the rolling resistance TL on a flat road can be deemed to be zero. Additionally, the term "W·g·sin θ" in the relational expression (f1) corresponds to a value of the offset torque required to hold the vehicle 10 in a stopped state on the sloping road with the gradient θ.

From the above relational expression (f1), the following expression (f2) can be derived:

$$T0 = TM - I \cdot AC \quad \text{(f2)}$$

where T0 represents the offset torque "W·g·sin θ".

Let us assume a situation where the vehicle 10 is stopped or is traveling just before a stop. In this assumption, the total output torque TM of the motor-generators 31a and 31b can be deemed to be substantially zero, and the rolling resistance TL on a flat road can also be deemed to be zero. It therefore can be deemed that gravity is only applied to the vehicle 10. For these reasons, the following relational expression (f3) can be established in the situation where the vehicle 10 is stopped or is traveling just before a stop:

$$-W \cdot g \cdot \sin\theta = I \cdot AG \quad \text{(f3)}$$

where AG represents a component of the acceleration of gravity g in the traveling direction of the vehicle 10.

This therefore makes it possible to calculate a value of the offset torque T0 in the situation where the vehicle 10 is stopped or is traveling just before a stop in the following expression (f4):

$$T0 = -I \cdot AG \quad \text{(f4)}$$

The measured acceleration AS of the vehicle 10 includes not only an acceleration component of the vehicle 10 in the traveling direction of the vehicle 10 but also the component AG of the acceleration of gravity g in the traveling direction of the vehicle 10. In the situation where the vehicle 10 is stopped or is traveling just before a stop, the acceleration component of the vehicle 10 in the traveling direction of the vehicle 10 can be deemed to be zero. For this reason, the measured acceleration AS of the vehicle 10 becomes only the component AG of the acceleration of gravity g in the traveling direction of the vehicle 10. This therefore enables the measured acceleration AS of the vehicle 10 to be directly used as the component AG of the acceleration of gravity g in the traveling direction of the vehicle 10 in the expression (f4). The measured acceleration AS of the vehicle 10 corresponds to a second acceleration that is the component AG of the acceleration of gravity g in the traveling direction of the vehicle 10 according to the first embodiment. The acceleration sensor 62 serves as a second acceleration determiner.

The acceleration of the vehicle 10 has a correlation relationship with a rotational acceleration of each of the motor-generators 31a and 31b. The amount of change of at least one of the rotational speeds ωMa and ωMb of the motor-generators 31a and 31b, which are measured by the respective rotation sensors 35a and 35b, per unit of time enables the acceleration AC of the vehicle 10 to be determined. In other words, a differential value of at least one of the rotational speeds ωMa and ωMb of the motor-generators 31a and 31b enables the acceleration AC of the vehicle 10 to be determined. For example, the EV ECU 70 can be configured to determine the acceleration AC of the vehicle 10 as a function of at least one of the rotational speeds ωMa and ωMb of the motor-generators 31a and 31b.

Each of the rotation sensors 35a and 35b serves as a rotational speed measuring unit. The acceleration AC of the vehicle 10 that can be determined by the differential value of at least one of the rotational speeds ωMa and ωMb of the motor-generators 31a and 31b serves as a first acceleration. The EV ECU 70 serves as a first acceleration determiner for determining, based on at least one of the rotational speeds ωMa and ωMb of the motor-generators 31a and 31b, the acceleration AC of the vehicle 10.

Next, the following describes a learning routine of the offset torque T0 carried out by the stop controller 702 based on the above principles with reference to FIG. 6. The stop controller 702 is programmed to iterate a cycle of the learning routine.

Referring to FIG. 6, the stop controller 702 determines whether the speed VC of the vehicle 10 measured by the vehicle speed sensor 63 is higher than or equal to a predetermined first threshold speed Vth10 in step S10. The first threshold speed Vth10 is previously set to a value that enables whether the vehicle 10 is stopped or is traveling just before a stop or is traveling normally to be determined. The first threshold speed Vth10 is set to, for example, 1 km/h.

Upon determination that the speed VC of the vehicle 10 measured by the vehicle speed sensor 63 is higher than or equal to the first threshold speed Vth10 (YES in step S10), the stop controller 702 performs a traveling-vehicle learning subroutine in S11.

Specifically, the stop controller 702 calculates the acceleration AC of the vehicle 10 as a function of at least one of the rotational speeds ωMa and ωMb of the motor-generators 31a and 31b, which are measured by the respective rotation sensors 35a and 35b in step S11. For example, the stop controller 702 calculates the acceleration AC of the vehicle 10 in accordance with, for example, an arithmetic expression or a map representing a correlative relationship between the acceleration AC of the vehicle 10 and the at least one of the rotational speeds ωMa and ωMb of the motor-generators 31a and 31b.

Next, the stop controller 702 calculates the sum of the output torque TMa of the motor-generator 31a measured by the torque sensor 34a and the output torque TMb of the motor-generator 31b measured by the torque sensor 34b to thereby calculate the total output torque TM of the motor-generators 31a and 31b in step S11. Then, the stop controller 702 calculates a value of the offset torque T0 at a value of the gradient θ of a road on which the vehicle 10 is traveling in accordance with (i) the relational expression (f2), (ii) the calculated acceleration AC of the vehicle 10, (iii) the calculated total output torque TM of the motor-generators 31a and 31b, and (iv) a value of the inertia I of the vehicle 10 stored in the memory of the EV ECU 70 in step S11.

Otherwise, upon determination that the speed VC of the vehicle 10 measured by the vehicle speed sensor 63 is lower than the first threshold speed Vth10 (NO in step S10), the stop controller 702 performs a stopped-vehicle learning subroutine in S12.

Specifically, the stop controller 702 calculates a value of the offset torque T0 at a value of the gradient θ of a road on which the vehicle 10 is stopped in accordance with the relational expression (f4) and the measured acceleration AS that is the component AG of the acceleration of gravity g in the traveling direction of the vehicle 10 in step S12.

Following the operation in step S11 or S12, the stop controller 702 performs a filtering task that passes the value of the offset torque T0 through a lowpass filter with a predetermined time constant of, for example, 1 second in step S13. Then, the stop controller 702 stores the filtered value of the offset torque T0 at the value of the gradient θ of the road on which the vehicle 10 is traveling or is stopped in the memory of the EV ECU 70 in step S13.

The stop controller 702 serves as an offset torque calculator for calculating the offset torque T0 according to the first embodiment.

Figure 7:
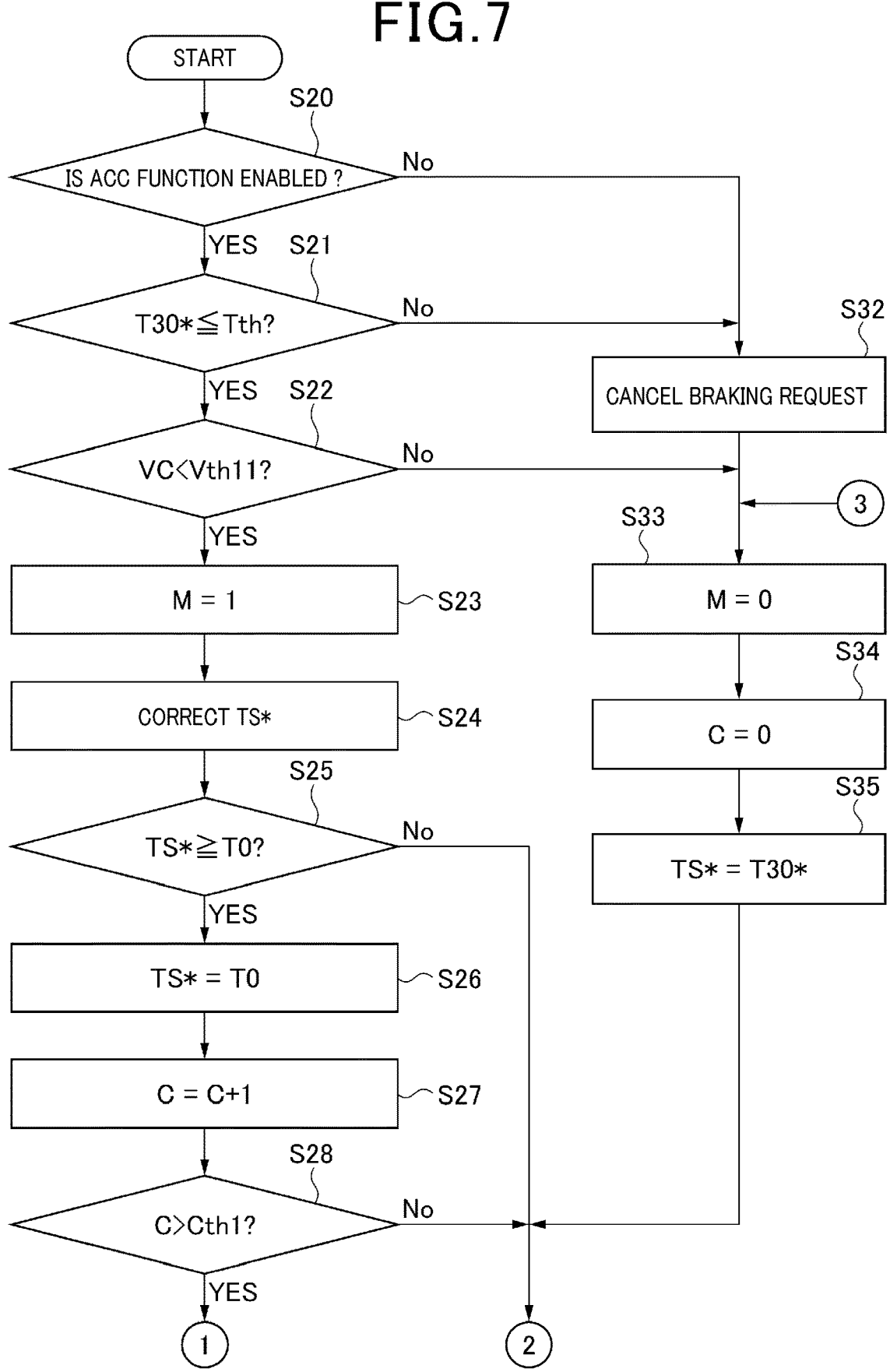
FIG. 7 is a flowchart schematically illustrating the remaining part of the learning routine of the offset torque carried out by the stop controller according to the first embodiment.
Figure 8:
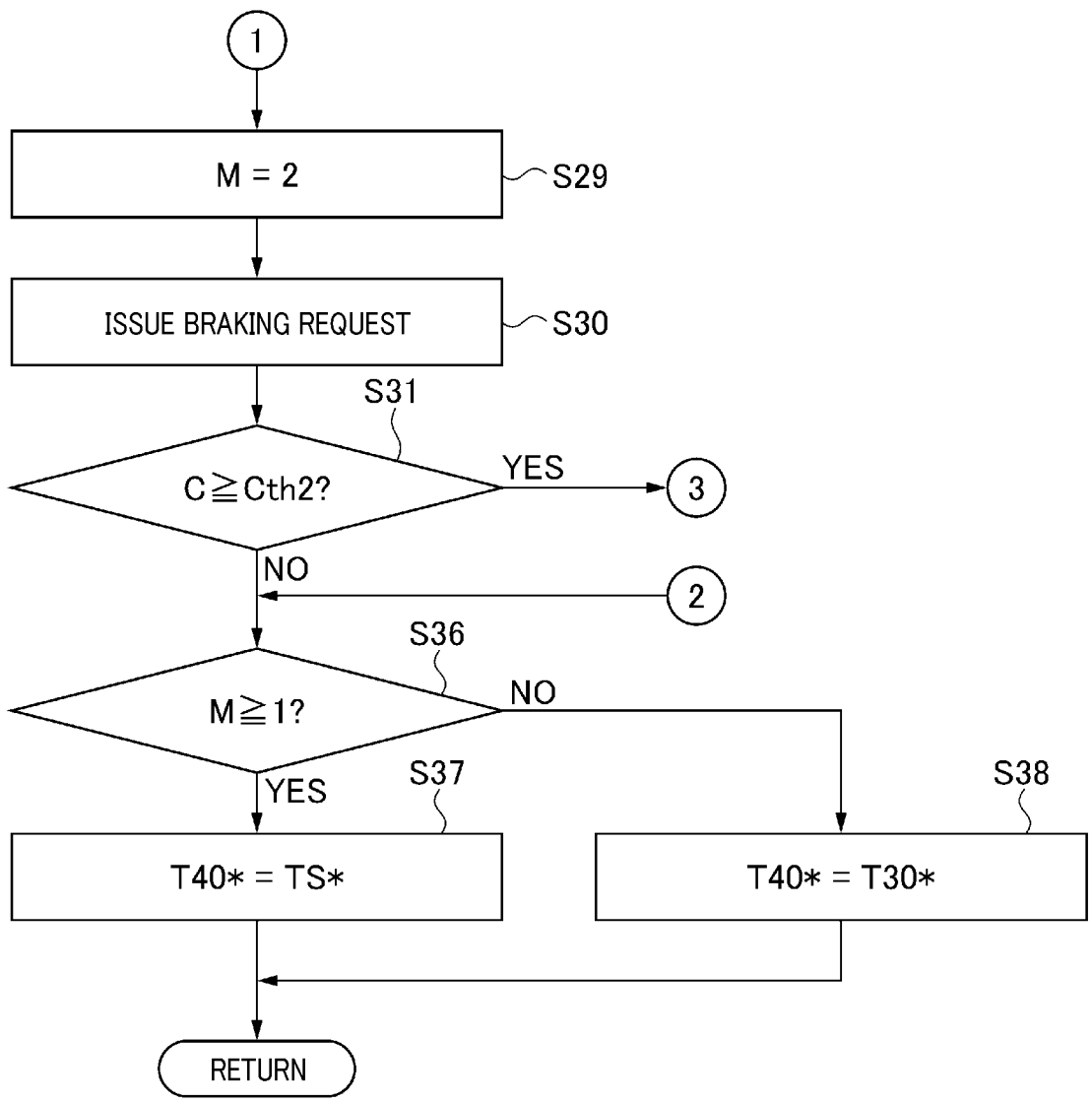
FIG. 8 is a flowchart schematically illustrating a stop control routine carried out by the stop controller according to the first embodiment.

Next, the following describes a stop control routine carried out by the stop controller 702 with reference to FIGS. 7 and 8. The stop controller 702 is programmed to iterate a cycle of the stop control routine.

Referring to FIG. 6, when starting a current cycle of the stop control routine, the stop controller 702 determines whether the ACC function is enabled based on the ACC flag Fa transmitted from the ACC ECU 71 in step S20.

Upon determination that the ACC function is disabled (NO in step S20), the stop controller 702 determines that there is no need of performing a stop control task of the vehicle 10 on a sloping road, and performs the following operations in steps S32 to S35.

Specifically, the stop controller 702 cancels a braking request for activation of each braking device 40a to 40d, which has been issued to the brake ECU 72 in step S32. Next, the stop controller 702 sets a previously prepared stop-control mode M to 0 in step S33, and initializes a count value of a previously prepared counter C to 0 in step S34.

Following the operation in step S34, the stop controller 702 sets a stop torque command TS* to a current value of the base torque command T30* in step S35. Next, the stop controller 702 determines whether the value of the stop-control mode M is more than or equal to 1 (M≥1) in step S36 of FIG. 8. Because the stop-control mode M has been set to 0 in step S33, the stop controller 702 determines that the value of the stop-control mode M is less than 1 (M<0) (NO in step S36). Then, the stop controller 702 determines the base torque command T30* as the final torque command T40* in step S38. Thereafter, the stop controller 702 terminates the current cycle of the stop control routine illustrated in FIGS. 7 and 8, returning to a next cycle of the stop control routine illustrated in FIGS. 7 and 8.

Otherwise, upon determination that the ACC function is enabled (YES in step S20), the stop controller 702 determines whether the base torque command T30* is lower than or equal to a predetermined threshold value Tth in step S21. The predetermined threshold value Tth is previously determined to enable determination of whether deceleration of the vehicle 10 is requested, and is stored in the memory of the EV ECU 70.

Upon determination that the base torque command T30* is higher than the predetermined threshold value Tth, i.e., that deceleration of the vehicle 10 is not requested (NO in step S21), the stop controller 702 performs the operations in steps S32 to S36 and S38.

Otherwise, upon determination that the base torque command T30* is lower than or equal to the predetermined threshold value Tth, i.e., that deceleration of the vehicle 10 is requested (YES in step S21), the stop controller 702 determines whether the speed VC of the vehicle 10 is lower than a predetermined second threshold speed Vth11 in step S22. The second threshold speed Vth11 is previously set to a value that enables whether the vehicle 10 is traveling at a low speed or is traveling at a speed higher than the low speed to be determined. The second threshold speed Vth11, which is stored in the memory of the EV ECU 70, is set to, for example, 3 km/h. The second threshold speed Vth11 corresponds to a predetermined control start speed.

Upon determination that the speed VC of the vehicle 10 is higher than or equal to the second threshold speed Vth11 (NO in step S22), the stop controller 702 performs the operations in steps S32 to S36 and S38.

As described above, execution of the operation in step S38 enables the base torque command T30* to be determined as the final torque command T40* upon determination that (I) the ACC function is disabled, (II) deceleration of the vehicle 10 is not requested, or (III) the vehicle 10 is traveling at a speed higher than or equal to the second threshold speed Vth11

This results in each of the motor-generators 31a and 31b applying, to the corresponding one of the driving wheels 11 and 12, drive power or braking force based on the base command torque T30*.

Otherwise, the stop controller 702 performs the operation in step S23 and the subsequent operations as long as all the following conditions (I) to (III) are satisfied, i.e., all the determinations in steps S20 to S22 are affirmative:

(I) The ACC function is enabled.
(II) Deceleration of the vehicle 10 is requested.
(III) The speed VC of the vehicle 10 is lower than the second threshold speed Vth11.

Specifically, the stop controller 702 sets the stop-control mode M to 1 in step S23, and corrects a current value of the stop torque command TS* in accordance with the following expression (f5) in step S24:

$$TS^* = TS(i-1) + \Delta T \quad (f5)$$

where:
TS (i−1) represents an immediately previous value of the stop torque command TS*; and
$\Delta T$ represents a parameter stored in the memory of the EV ECU 70.

Following the operation in step S24, the stop controller 702 determines whether the current value of the stop torque command TS* is higher than or equal to the offset torque T0 stored in the memory of the EV ECU 70 in step S25.

Upon determination that the current value of the stop torque command TS* is lower than the offset torque T0 (NO in step S25), the stop controller 702 deter mines whether the value of the stop-control mode M is more than or equal to 1 (M≥1) in step S36 of FIG. 8. Because the stop-control mode M has been set to 1 in step S23, the stop controller 702 determines that the value of the stop-control mode M is more than or equal to 1 (M≥1) (YES in step S36). Then, the stop controller 702 determines the stop torque command TS* as the final torque command T40* in step S37. Thereafter, the stop controller 702 terminates the current cycle of the stop control routine illustrated in FIGS. 7 and 8, returning and subsequently performs a next cycle of the stop control routine illustrated in FIGS. 7 and 8.

That is, the stop controller 702 iterates a cycle of the stop control routine including the operation in step S24 until the determination in step S25 is affirmative, i.e., the stop torque command TS* has reached the offset torque T0. The performed cycles of the stop control routine including the operation in step S24 enable the stop torque command TS* to gradually increase toward the offset torque T0. Because the stop controller 702 determines the stop torque command TS* as the final torque command T40* in each of the performed cycles of the stop control routine, the total output torque TM of the motor-generators 31a and 31b changes toward the offset torque T0.

Thereafter, when the current value of the stop torque command TS* has reached the offset torque T0, so that it is determined that the current value of the stop torque command TS* is higher than or equal to the offset torque T0 (YES in step S25). Then, the stop controller 702 determines the stop torque command TS* as the offset torque T0 in step S26, and increments the count value of the counter C by 1 in step S27.

Following the operation in step S27, the stop controller 702 determines whether the count value of the counter C is more than or equal to a first threshold Cth11 in step S28. The first threshold Cth11 is determined to a value that enables determination of whether a first predetermined time T11 has elapsed since the stop torque command TS* was determined as the offset torque T0 in step S26; the first threshold Cth11 is stored in the memory of the EV ECU 70. The first predetermined time T11 is set to, for example, 1 second.

Upon determination that the count value of the counter C is less than the first threshold Cth11, i.e., that the first predetermined time has not elapsed since the stop torque command TS* was determined as the offset torque T0 (NO in step S28), the stop controller 702 performs negative determination in step S36 of FIG. 8, and thereafter performs the operation in step S37. This enables the stop torque command TS* and the final torque command T40* to be maintained at the offset torque T0 until the first predetermined time T11 has elapsed since the stop torque command TS* was determined as the offset torque T0.

Thereafter, when the first predetermined time has elapsed since the stop torque command TS* was determined as the offset torque T0, the stop controller 702 performs affirmative determination in step S28, and thereafter sets the stop-control mode M to 2 in step S29. Following the operation in step S29, the stop controller 702 issues a braking request to the brake ECU 72 for activation of each braking device 40a to 40d in step S30. This causes the brake ECU 72 to activate each braking device 40a to 40d, thus applying braking force generated by each braking device 40a to 40d to the corresponding one of the wheels 11 to 14. This therefore makes it possible to hold the vehicle 10 in the stopped state on the surface of a sloping road.

Following the operation in step S30, the stop controller 702 determines whether the count value of the counter C is more than or equal to a predetermined second threshold Cth2. The second threshold Cth12 is determined to a value that enables determination of whether a second predetermined time T12 has elapsed since the operation in step S30 was performed, i.e., the braking request to the brake ECU 72 was issued; the second threshold Cth12 is stored in the memory of the EV ECU 70.

The second predetermined time T12 is determined to permit a time lag required until a sufficient amount of braking force has been applied to each wheel 11 to 14 since the issuance of the braking request to the brake ECU 72, which is set to, for example, 2 seconds.

Upon determination that the count value of the counter C is less than the second threshold Cth12, i.e., that the second predetermined time has not elapsed since the braking request to the brake ECU 72 was issued (NO in step S31), the stop controller 702 performs negative determination in step S36 of FIG. 8, and thereafter performs the operation in step S37.

This enables the stop torque command TS* and the final torque command T40* to be maintained at the offset torque T0 until the second predetermined time T12 has elapsed since the braking request to the brake ECU 72 was issued.

Thereafter, when the second predetermined time has elapsed since the braking request to the brake ECU 72 was issued, the stop controller 702 performs affirmative determination in step S31, and thereafter performs the operation in step S33 and the subsequent operations.

Specifically, the stop controller 702 sets the stop-control mode M to 0 in step S33, and initializes the count value of the counter C to 0 in step S34.

Following the operation in step S34, the stop controller 702 sets the stop torque command TS* to the current value of the base torque command T30* in step S35. At that time, because the current value of the base command torque T30* has become zero or a value adjacent to zero, the stop torque command T is set to zero or a value close to zero.

Next, the stop controller 702 determines whether the value of the stop-control mode M is more than or equal to 1 (M≥1) in step S36 of FIG. 8. Because the stop-control mode M has been set to 0 in step S33, the stop controller 702 determines that the value of the stop-control mode M is less than 1 (M<0) (NO in step S36). Then, the stop controller 702 determines the base torque command T30* as the final torque command T40* in step S38. Thereafter, the stop controller 702 terminates the current cycle of the stop control routine illustrated in FIGS. 7 and 8, returning to a next cycle of the stop control routine illustrated in FIGS. 7 and 8.

Next, the following describes a first example of how selected operation parameters of the vehicle 10 change over time with reference to FIGS. 9A to 9D, and a second example of how selected operation parameters of the vehicle 10 change over time with reference to FIGS. 10A to 10D.

As illustrated in FIGS. 9A to 9D, in the first example, the vehicle 10 travels on a downslope road within a period from time t10 to time t11, and thereafter travels on a flat road within a period from the time t11 to time t12, and thereafter travels on an upslope road from the time t12.

Let us assume that the accelerator pedal of the vehicle 10 is maintained at a position corresponding to a constant operated amount of the accelerator pedal from the time t10.

In this assumption, as illustrated in FIG. 9B, the total output torque TM of the motor-generators 31a and 31b is maintained at a constant value. This results in the speed VC of the vehicle 10 changes as illustrated in FIG. 9A. Specifically, while the vehicle 10 travels on the downslope road within the period from the time t10 to the time t11, the speed VC of the vehicle 10 gradually increases, because gravity acts on the vehicle 10 in the traveling direction. While the vehicle 10 travels on the flat road within the period from the time t11 to the time t12, the speed VC of the vehicle 10 is maintained at a constant speed, because gravity acts on the vehicle 10 in a direction perpendicular to the traveling direction.

While the vehicle 10 travels on the upslope road from the time t12, the speed VC of the vehicle 10 gradually decreases, because gravity acts on the vehicle 10 in the backward direction opposite to the traveling direction.

The change of the speed VC of the vehicle 10 as illustrated in FIG. 9A results in the acceleration AC of the vehicle 10 in the traveling direction remaining over zero within the period from the time t10 to the time t11, and remaining at zero within the period from the time t11 to the time t12 (see dash-dot-dash line in FIG. 9C). From the time t12, the acceleration AC of the vehicle 10 in the traveling direction remains below zero (see dash-dot-dash line in FIG. 9C). Because the measured acceleration AS of the vehicle 10 includes not only the acceleration AC of the vehicle 10 in the traveling direction but also the acceleration of gravity, the measured acceleration AS of the vehicle 10 changes over time (see solid line in FIG. 9C).

When learning the offset torque T0 in accordance with the acceleration AC of the vehicle 10 in the traveling direction (see FIG. 9B), the total output torque TM of the motor-generators 31a and 31b (see FIG. 9C), and the above expression (f2), the stop controller 702 obtains the offset torque T0 as illustrated in FIG. 9D.

Next, the following describes the second example of how selected operation parameters of the vehicle 10 change over time when the vehicle 10, whose ACC function is enabled, traveling on an upslope road is stopped on the upslope road with reference to FIGS. 10A to 10D.

Let us assume a situation where, while the vehicle 10 is traveling on the upslope road, the ACC ECU 71 analyzes the condition of the preceding vehicle in front of the vehicle 10 to accordingly transmit, to the EV ECU 70, the second ACC torque command T22* having a negative value in order to stop the vehicle 10.

In this situation, the second ACC torque command T22* is determined as the base torque command T30*, and the base torque command T30*, i.e., the second ACC torque command T22*, is used as the final torque command T40*. This results in the second ACC torque command T22* being determined as the final torque command T40* at time t20 (see FIGS. 10A to 10D).

At the time t20, as illustrated in FIG. 9C, the final torque command T40* is set to a negative value. This causes the motor-generators 31a and 31b to operate in the regenerative mode to accordingly apply braking force to the respective driving wheels 11 and 12. This results in the speed VC of the vehicle 10 gradually decreasing as illustrated in FIG. 10A while the stop-control mode M being maintained at 0.

Thereafter, when the speed VC of the vehicle 10 decrease down to the second threshold speed Vth11 at time t21, the stop-control mode M is set to 1 at the time t21 as illustrated in FIG. 10B. At the time t21, the stop torque command TS* is calculated in accordance with the expression (f5), and the calculated stop torque command TS* is used as the final torque command T40*. This results in, as illustrated in FIG. 10C, the final torque command T40* gradually increasing toward the offset torque T0 at the inclination of the parameter ΔT from the time t21.

When the stop torque command TS* has reached the offset torque T0 at time t22, the stop torque command TS* is fixed to the offset torque T0, and the stop torque command TS*, i.e., the offset torque T0, is used as the final torque command T40*. This results in, as illustrated in FIG. 10C, the final torque command T40* being maintained at the offset torque T0.

Thereafter, when the first predetermined time T11 has elapsed since the time t22, the stop-control mode M is set to 2 at time t23 (see FIG. 10B). At the time t23, the braking request is issued from the stop controller 702 to the braking ECU 72 for activation of each braking device 40a to 40d. This results in, as illustrated in FIG. 10D, the braking force applied to each wheel 11 to 14 from the corresponding braking device 40a to 40d gradually increasing. When the second predetermined time T12 has elapsed since the time t23, the final torque command T40* is returned to the base torque command T30* at time t24, resulting in, as illustrated in FIG. 10D, the final torque command T40* being set to, for example, 0. That is, the braking force applied to each driving wheel 11, 12 from the corresponding motor-generator 31a, 31b is cancelled at the time t24. At the time t24, the braking force applied from each braking device 40a to 40d to the corresponding wheel 11 to 14 makes it possible to hold the vehicle 10 in the stopped state.

The control apparatus 80 of the vehicle 10 according to the first embodiment achieves the following first to sixth advantageous benefits:

The first advantageous benefit is as follows. Specifically, the EV ECU 70 and MG ECU 33a and 33b are configured to cooperatively control, when stopping the vehicle 10 on the surface of a sloping road having a gradient of θ degrees, the total output torque TM of the motor-generators 31a and 31b to asymptotically approach the offset torque T0. This configuration causes the total output torque TM of the motor-generators 31a and 31b to gradually change toward the offset torque T0, making it possible to prevent the occurrence of shock at the stop of the vehicle 10.

This configuration additionally causes each of the motor-generators 31a and 31b to apply the offset torque T0 to the corresponding one of the driving wheels 11 and 12 at the stop of the vehicle 10 on the surface of the sloping road having the gradient of 0 degrees, making it possible to hold the vehicle 10 in a stopped state on the surface of the sloping road having the gradient of θ degrees.

This therefore enables the vehicle 10 to stop on such a sloping road more smoothly.

The second advantageous benefit is as follows.

The stop controller 702 is configured to calculate the offset torque T0 in accordance with the expression (f2), the total output torque TM of the motor-generators 31a and 31b, and the calculated acceleration AC of the vehicle 10 in the traveling direction upon determination that the speed VC of the vehicle 10 is higher than or equal to the first threshold speed Vth11 (see the operations in steps S10 and S11 in FIG. 6). Alternatively, the stop controller 702 is configured to calculate the offset torque T0 in accordance with the expression (f4) and the measured acceleration AS upon determination that the speed VC of the vehicle 10 is lower than the first threshold speed Vth11 (see the operations in steps S10 and S12 in FIG. 6).

This therefore enables the stop controller 72 to easily obtain the offset torque T0.

The third advantageous benefit is as follows.

The EV ECU 70 is configured to calculate the acceleration AC of the vehicle 10 in the traveling direction in accordance with the rotational speeds ωMa and ωMb of the motor-generators 31a and 31b measured by the respective rotation sensors 35a and 35b. This configuration therefore enables the EV ECU 70 to easily obtain the acceleration AC of the vehicle 10 in the traveling direction.

The fourth advantageous benefit is as follows.

The stop controller 702 is configured to perform, every predetermined cycle, calculation of a value of the offset torque T0 (see FIG. 6), and perform the filtering task that passes the value of the offset torque T0 calculated for each cycle through the lowpass filter.

This configuration enables the values of the offset torque T0 calculated for the respective cycles to be smoothed, making it possible to obtain the values of the offset torque T0 from which disturbance factors have been eliminated.

The fifth advantageous benefit is as follows.

Specifically, the EV ECU 70 and MG ECU 33a and 33b are configured to cooperatively start a task of causing the total output torque TM of the motor-generators 31a and 31b to asymptotically approach the offset torque T0 in response to determination that the speed VC of the vehicle 10 becomes lower than the first threshold Vth11.

This configuration performs the task of causing the total output torque TM of the motor-generators 31a and 31b to asymptotically approach the offset torque T0 in a situation where the vehicle 10 is likely to stop, making it possible to perform, at more appropriate timing, the task of causing the total output torque TM of the motor-generators 31a and 31b to asymptotically approach the offset torque T0.

The sixth advantageous benefit is as follows.

Continuous application of braking force from each of the motor-generators 31a and 31b to the corresponding one of the driving wheels 11 and 12 for holding the vehicle 10 in a stopped state may result in an increase in power consumption of the vehicle 10.

From this viewpoint, the EV ECU 70 according to the first embodiment is configured to (1) Request, after the output torque TMa of the motor-generator 31a and the output torque TMb of the motor-generator 31b have reached the offset torque T0, the brake ECU 72 to cause each of the braking devices 40a to 40d to apply braking force to the corresponding one of the wheels 11 to 14

(2) Deactivate the motor-generators 31a and 31b

This configuration makes it possible to hold, based on the braking force applied to each wheel 11 to 14 from the corresponding braking device 40a to 40d, the vehicle 10 in a stopped state while deactivating the motor-generators 31a and 31b to accordingly reduce power consumption of the vehicle 10.

Second Embodiment

The following describes the control apparatus 80 of the vehicle 10 according to the second embodiment of the present disclosure while focusing on different points of the control apparatus 80 second embodiment from that of the first embodiment.

Figure 11:
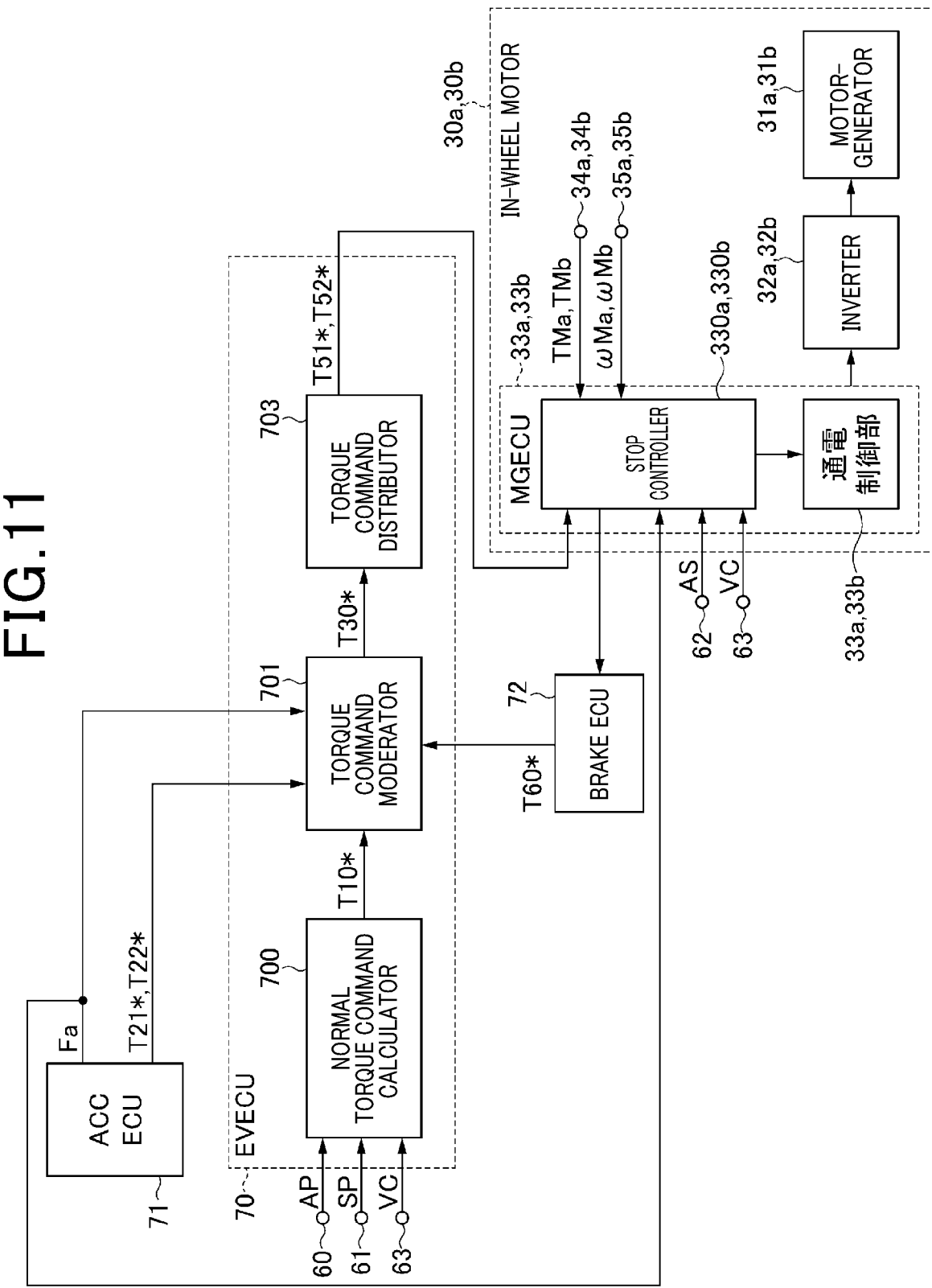
FIG. 11 is a block diagram illustrating a configuration of an EV ECU according to the second embodiment.

Referring to FIG. 11, the EV ECU 70 of the second embodiment is configured such that the base torque command T30* calculated by the torque command moderator 701 is inputted to the torque command distributor 703.

The torque command distributor 703 is configured to receive the base torque command T30* inputted thereto from the torque command attributor 701, and calculate, based on the received base torque T30*, the first torque command T51* and the second torque command T52*. The first torque command T51* represents the target value of torque that should be outputted from the motor-generator 31a of the in-wheel motor 30a, and the second torque command T52* represents the target value of torque that should be outputted from the motor-generator 31b of the in-wheel motor 30b.

The torque command distributor 703 is additionally configured to transmit the first torque command T51* and the second torque command T52* to the respective MG ECU 33a and 33b of the in-wheel motors 30a and 30b.

The MG ECU 33a for the in-wheel motor 30a includes a stop controller 330a and an energization controller 331a. Similarly, the MG ECU 33b for the in-wheel motor 30b includes a stop controller 330b and an energization controller 331b.

The stop controller 330a is configured to receive (i) the first torque command T51* transmitted from the torque command distributor 703, (ii) the ACC flag Fa transmitted from the ACC ECU 71, and (iii) the measurement signals outputted from the respective acceleration sensor 62, the vehicle speed sensor 63, the torque sensors 34a and 34b, and the rotation sensor 35a.

The stop controller 330a is configured to obtain, based on the received measurement signals, the acceleration AS measured by the acceleration sensor 62, i.e., the measured acceleration AS, the speed VC of the vehicle 10 measured by the vehicle speed sensor 63, the output torque TMa of the motor-generator 31a, the output torque TMb of the motor-generator 31b, and the rotation speed ωMa of the motor-generator 31a.

Then, the stop controller 330a is configured to
(1) Perform, based on the obtained information items, which include the measured acceleration AS, the speed VC of the vehicle 10, the output torque TMa, the output torque TMb, and the rotation speed co M, a correction task, which is identical to that performed by the stop controller 702 of the first embodiment
(2) Transmit, to the energization controller 331a, corrected first torque command T30*

The energization controller 331a is configured to controllably drive the inverter 32a, thus controlling how the motor-generator 31a is energized.

This enables the motor-generator 31a to output torque corresponding to the corrected first torque command T51*.

Because operations of each of the stop controller 330b and the energization controller 311b provided for the in-wheel motor 30b are substantially identical to those of the corresponding one of the stop controller 330a and the energization controller 331a provided for the in-wheel motor 30a, detailed descriptions of the operations of each of the stop controller 330b and the energization controller 311b are omitted.

The controller 80 of the second embodiment, which is configured set forth above, makes it possible to cause, when stopping the vehicle 10 that is traveling on the surface of a sloping road with a gradient of 0 degrees, the total output torque TM of the motor-generators 31a and 31b to asymptotically approach the offset torque T0.

The control apparatus 80 of the vehicle 10 according to the second embodiment achieves the following seventh advantageous benefit:

Specifically, the MG ECU 33a and 33b are configured to cooperatively control, when stopping the vehicle 10 on the surface of a sloping road having a gradient of θ degrees, the total output torque TM of the motor-generators 31a and 31b to asymptotically approach the offset torque T0.

This configuration of the control apparatus 80 is configures such that the MG ECU 33a and 33b take on the control of causing the total output torque TM of the motor-generators 31a and 31b to asymptotically approach the offset torque T0. This configuration of the control apparatus 80 according to the second embodiment therefore makes it possible to reduce processing load of the EV ECU 70 to be lower as compared with that of the EV ECU 70 of the control apparatus 80 according to the first embodiment.

Modifications

The above first and second embodiments can be variably modified as follows:

The stop controller 702 can be configured to calculate the offset torque T0 in accordance with a differential value between the acceleration AC of the vehicle 10 in the traveling direction and the acceleration AS measured by the acceleration sensor 62 in place of the expression (f2).

Figure 12:
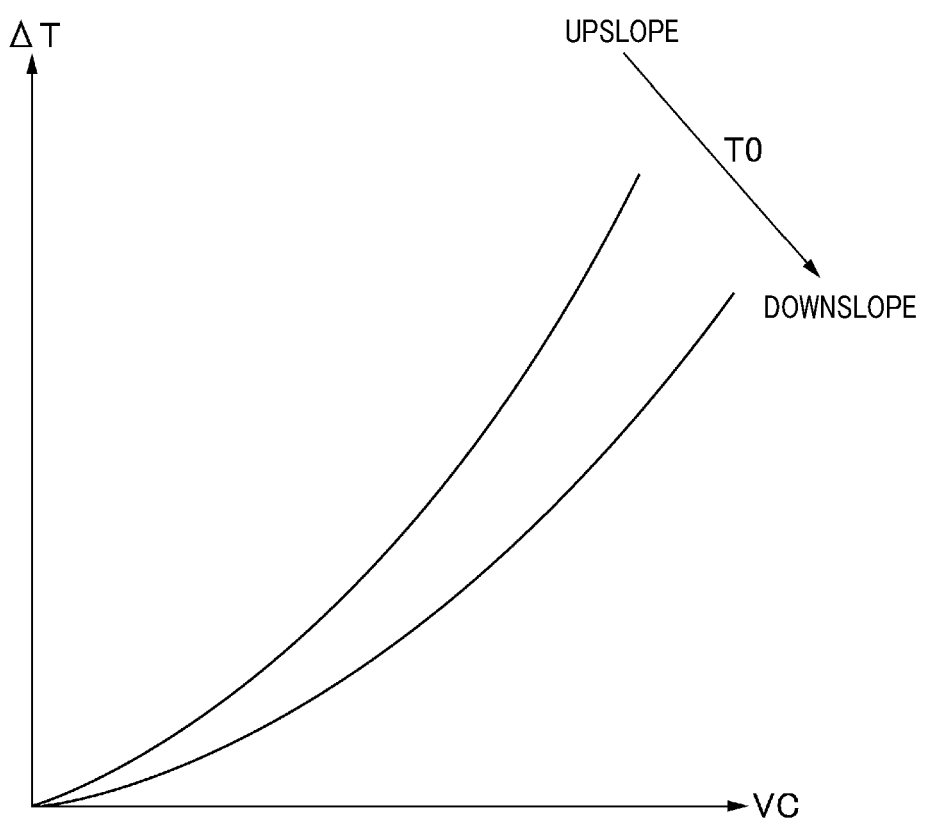
FIG. 12 is a diagram illustrating maps that are used for the stop controller according to a modification to calculate a value of a parameter as a function of a value of the speed of the vehicle and a value of the offset torque.

The stop controller 702 can be configured to change the parameter ΔT employed in the expression (f5) in accordance with maps illustrated in FIG. 12; each map represents a relationship between
(1) Values of the parameter ΔT
(2) Values of the offset torque T0
(3) Values of the speed VC of the vehicle 10

Because values of the offset torque T0 have correlations with respective values of the gradient θ of a road surface, changing the parameter ΔT using the maps illustrated in FIG. 12 enables the parameter ΔT to change based on change of the gradient θ of a road surface.

The control apparatus 80 according to each of the first and second embodiments can be applied to a vehicle including a one-pedal driving configuration that enables a driver to an acceleration operation and a braking operation using one pedal.

Specifically, the one-pedal driving configuration installed in a vehicle enables the vehicle to (i) accelerate when a driver depresses one pedal, and (ii) decelerate the vehicle when the driver releases the one pedal to return its original position.

Applying the control apparatus 80 according to each of the first and second embodiments to such a vehicle including the one-pedal driving configuration enables the control apparatus 80 to perform the task of causing the total output torque TM of the motor-generators 31a and 31b to asymptotically approach the offset torque T0 during release of the depressed pedal for deceleration of the vehicle 10. This therefore results in the vehicle 10 being more smoothly stopped on a sloping road.

The control apparatuses 80 and control methods described in the present disclosure can be implemented by a dedicated computer including a memory and a processor programmed to perform one or more functions embodied by one or more computer programs.

The control apparatuses 80 and control methods described in the present disclosure can also be implemented by a dedicated computer including a processor comprised of one or more dedicated hardware logic circuits.

The control apparatuses 80 and control methods described in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer. Each dedicated hardware logic circuit or hardware logic circuit can be implemented by one or more digital circuits including plural logic gates or one or more analog circuits.

The present disclosure is not limited to the above embodiments. The design of at least one of the embodiments, which has been modified by a skilled person in the art, can be within the scope of the present disclosure as long as the modified design of the at least one of the embodiments includes the features of the present disclosure.

Appropriate modifications can be made to the components of the embodiments and the arrangements, conditions, and shapes thereof. Appropriate changes can be made to the combination of the components of the embodiments unless a technical inconsistency arises therefrom. disclosure.

What is claimed is:

1. A control apparatus for causing a motor-generator of a vehicle to apply drive power to at least one wheel of the vehicle, and operate, at a stop of the vehicle, in a regenerative mode to apply braking force to the at least one wheel of the vehicle, the control apparatus comprising:
- an offset torque calculator configured to calculate offset torque to be applied to the at least one wheel of the vehicle, the offset torque being required to stop the vehicle on a sloping road having a predetermined gradient; and
- a motor controller configured to, in stopping of the vehicle on the sloping road having the predetermined gradient, cause output torque of the motor-generator to gradually approach the offset torque while maintaining a deceleration of the vehicle to be substantially constant.

2. The control apparatus according to claim 1, further comprising:
- a torque measuring unit configured to measure the output torque of the motor-generator; and
- an acceleration measuring unit configured to measure acceleration of the vehicle in a traveling direction thereof, wherein:
- the offset torque calculator is configured to calculate the offset torque in accordance with the output torque of the motor-generator and the acceleration of the vehicle in the traveling direction.

3. The control apparatus according to claim 2, wherein:
the acceleration measuring unit is a first acceleration unit configured to measure first acceleration that is the acceleration of the vehicle in the traveling direction, the control apparatus further comprising:
- a second acceleration measuring unit configured to measure, as second acceleration of the vehicle, an acceleration component of acceleration gravity in the traveling direction, the offset torque calculator being configured to:
  - calculate the offset torque in accordance with the output torque of the motor-generator and the first acceleration of the vehicle in the traveling direction upon determination that a speed of the vehicle in the traveling direction is higher than or equal to a predetermined threshold speed; and
  - calculate the offset torque in accordance with the output torque of the motor-generator and the second acceleration of the vehicle in the traveling direction upon determination that the speed of the vehicle in the traveling direction is lower than the predetermined threshold speed.

4. The control apparatus according to claim 1, further comprising:
- a first acceleration measuring unit configured to measure first acceleration of the vehicle in a traveling direction thereof; and
- a second acceleration measuring unit configured to measure, as second acceleration of the vehicle, an acceleration component of acceleration gravity in the traveling direction, wherein:
- the offset torque calculator is configured to perform the calculation of the offset torque in accordance with a differential value between the first acceleration and the second acceleration.

5. The control apparatus according to claim 3, further comprising:
- a rotational speed measuring unit configured to measure a rotational speed of the motor-generator, wherein:
- the first acceleration unit is configured to calculate the first acceleration in accordance with the rotational speed of the motor-generator.

6. The control apparatus according to claim 4, further comprising:
- a rotational speed measuring unit configured to measure a rotational speed of the motor-generator, wherein:
- the first acceleration unit is configured to calculate the first acceleration in accordance with the rotational speed of the motor-generator.

7. The control apparatus according to claim 1, wherein:
the offset torque calculator is configured to:
- calculate, every predetermined cycle, a value of the offset torque; and
- pass the value of the offset torque calculated for each cycle through a lowpass filter.

8. The control apparatus according to claim 1, wherein:
the motor controller comprises:
- a first control unit configured to determine a torque command representing a target value of the output torque of the motor-generator; and
- a second control unit configured to control energization of the motor-generator in accordance with the torque command to accordingly cause the output torque of the motor-generator to asymptotically approach the offset torque.

9. The control apparatus according to claim 1, wherein:
the motor controller is configured to start to cause the output torque of the motor-generator to gradually approach the offset torque in response to determination that a speed of the vehicle in a traveling direction thereof becomes lower than a predetermined control start speed.

10. The control apparatus according to claim 1, further comprising:
- a brake controller configured to control a braking device that applies, to the at least one wheel, the braking force in accordance with hydraulic pressure, wherein:
- the motor controller is configured to request the brake controller to cause the braking device to apply the braking force to the at least one wheel after the output torque of the motor-generator has reached the offset torque.

11. The control apparatus according to claim 1, wherein:
the motor controller is configured to, in stopping of the vehicle on the sloping road, cause the output torque of the motor-generator to gradually approach the offset torque while maintaining the deceleration of the vehicle to be substantially zero.

12. The control apparatus according to claim 1, wherein:
the motor controller is configured to increase a deceleration of the vehicle while maintaining the output torque of the motor-generator substantially at the offset torque.

* * * * *